(12) United States Patent
Abu-Ghdaib et al.

(10) Patent No.: US 11,083,998 B2
(45) Date of Patent: Aug. 10, 2021

(54) COMPACT HIGH-THROUGHPUT DEVICE FOR WATER TREATMENT

(71) Applicant: KING ABDULLAH UNIVERSITY OF SCIENCE AND TECHNOLOGY, Thuwal (SA)

(72) Inventors: Muhannad Ammar Abu-Ghdaib, Dhahran (SA); Noreddine Ghaffour, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 55 days.

(21) Appl. No.: 16/621,852

(22) PCT Filed: Jun. 14, 2018

(86) PCT No.: PCT/IB2018/054400
§ 371 (c)(1),
(2) Date: Dec. 12, 2019

(87) PCT Pub. No.: WO2018/234956
PCT Pub. Date: Dec. 27, 2018

(65) Prior Publication Data
US 2020/0101421 A1  Apr. 2, 2020

Related U.S. Application Data

(60) Provisional application No. 62/523,097, filed on Jun. 21, 2017.

(51) Int. Cl.
*B01D 63/14* (2006.01)
*B01D 61/00* (2006.01)
(Continued)

(52) U.S. Cl.
CPC .......... *B01D 63/14* (2013.01); *B01D 61/002* (2013.01); *B01D 61/364* (2013.01); *C02F 1/445* (2013.01);
(Continued)

(58) Field of Classification Search
CPC .... B01D 63/14; B01D 61/002; B01D 61/364; B01D 65/02; B01D 2313/125;
(Continued)

(56) References Cited

U.S. PATENT DOCUMENTS 3,266,629 A * 8/1966 Megibow ............. B01D 63/082
210/321.73
5,482,625 A * 1/1996 Shimizu ................. B01D 61/18
210/231

(Continued)

FOREIGN PATENT DOCUMENTS

EP  1676817 A1  7/2006
GB  2013105 A   8/1979

OTHER PUBLICATIONS

International Search Report in corresponding/related International Application No. PCT/IB2018/054400, dated Sep. 5, 2018.
(Continued)

*Primary Examiner* — Krishnan S Menon
(74) *Attorney, Agent, or Firm* — Patent Portfolio Builders PLLC

(57) ABSTRACT

A corrugated membrane plate and frame module for use in fluid treatment applications is disclosed, where the corrugated design increases production capacity of a module by more than 200% as compared to conventional modules. The increase is achieved by tripling the membrane packing density per module using an optimized corrugated design. The disclosed corrugated membrane plate and frame also reduces the inactive membrane area per module, which is
(Continued)

caused by deactivation of membranes edges attached to the plate and frame core in order to prevent leakage.

20 Claims, 15 Drawing Sheets

(51) Int. Cl.
    *B01D 61/36*     (2006.01)
    *C02F 1/44*     (2006.01)
    *B01D 65/02*     (2006.01)
    *C02F 3/12*     (2006.01)

(52) U.S. Cl.
    CPC ........ *B01D 65/02* (2013.01); *B01D 2313/125* (2013.01); *B01D 2313/14* (2013.01); *B01D 2313/243* (2013.01); *B01D 2313/26* (2013.01); *B01D 2321/18* (2013.01); *C02F 3/1268* (2013.01)

(58) Field of Classification Search
    CPC .......... B01D 2313/14; B01D 2313/243; B01D 2313/26; B01D 2321/18; B01D 2325/06; B01D 65/08; B01D 69/00; B01D 69/06; C02F 1/445; C02F 3/1268; C02F 1/44
    See application file for complete search history.

(56) References Cited

U.S. PATENT DOCUMENTS

| | | | | |
|---|---|---|---|---|
| 5,971,159 | A * | 10/1999 | Leone | B01D 29/012 209/399 |
| 6,450,345 | B1 * | 9/2002 | Adams | B01D 29/012 209/399 |
| 2004/0182055 | A1 * | 9/2004 | Wynn | B01D 46/0016 55/497 |
| 2008/0164201 | A1 * | 7/2008 | Gaudfrin | B01D 29/395 210/323.1 |
| 2015/0014232 | A1 * | 1/2015 | McGinnis | B01D 61/364 210/180 |
| 2017/0259215 | A1 * | 9/2017 | Blanke | B01D 63/081 |
| 2019/0367385 | A1 * | 12/2019 | Kelada | B01D 63/043 |

OTHER PUBLICATIONS

Written Opinion of the International Searching Authority in corresponding/related International Application No. PCT/IB2018/054400, dated Sep. 5, 2018.

* cited by examiner

COMPACT HIGH-THROUGHPUT DEVICE FOR WATER TREATMENT

RELATED APPLICATION DATA

This application is a U.S. National Stage Application of International Application No. PCT/IB2018/054400, filed Jun. 14, 2018, which claims the priority and benefit of U.S. Provisional Patent Application Ser. No. 62/523,097, filed Jun. 21, 2017, the entire contents of which are incorporated herein by reference.

TECHNICAL FIELD

The present invention relates to an apparatus and method for water treatment.

BACKGROUND OF THE INVENTION

The background of this invention will address water treatment, membrane technology, and submersible membrane systems.

Water Treatment

Global population projected increases over the next few decades will require water and energy for domestic, agricultural and industrial consumption, all of which ultimately rely on a rapidly diminishing global water supply. With water use expected to grow by twice the rate of population growth, a 2013 United Nations report estimated that by 2050 most countries around the world will experience water stressed conditions. A real need exists to discover alternative sources of water and adopt stricter water reclamation processes in safe, economical and efficient ways.

According to a United States Geological Survey report, approximately 97% of the Earth's water is saline, and as such, water filtration technology plays a critical role in opening up previously unusable water sources. The desalination process removes minerals from saline water, such as seawater, to produce water that is suitable for human or agricultural uses. Most of the interest in desalination focuses on production of fresh water for consumption and is particularly of interest in areas where seawater is abundant, but fresh water sources or rainwater may be limited. Though saline water exists in abundance, unfortunately, desalinating seawater can be costly because a large amount of energy is consumed in the process.

Saline water is only one of the many types of water that require reclamation. In addition to saline water, brackish water, domestic wastewater, industrial wastewater, and water from other impaired quality water sources require treatment in order to usable.

Water treatments are also used for pretreatment applications, produced water treatment, reduction of wastewater volumes, zero liquid discharge applications, salt production, food and beverage concentration, and pharmaceutical applications.

There are a number of means known for desalinating water, including distillation and evaporation, but the most prevalent is the use of reverse or forward osmosis membrane filtration utilizing membranes that allow water to permeate through the membrane while preventing minerals and salts from passing through the membrane.

Membrane Technology

A membrane is a selective barrier that with a partial permeability—it will allow certain substances to pass through the barrier, but prevent other substances from doing so. A membrane is usually defined by a discrete, thin interface that moderates the permeation of chemical species in contact with it. The substances that can pass through, or be prevented from passing through, the membrane interface may be molecules, ions or other small particles. The influent of an artificial membrane is known as the feed-stream, the liquid that passes through the membrane is known as permeate, and the liquid containing the retained constituents (substances that are prevented from passing through the membrane) is the retentate or concentrate. A normal filter meets this definition of a membrane, but, by convention, the term membrane is usually limited to structures that permeates dissolved or colloidal species, whereas the term filter is used to designate structures that separate larger-sized particulate suspensions.

Membranes can be generally classified into two classes: synthetic membranes and biological membranes. Biological membranes include cell membranes (outer coverings of cells or organelles that allow passage of certain constituents), nuclear membranes, which cover a cell nucleus, and tissue membranes, such as mucosae or serosae. Synthetic membranes are made by humans for use in laboratories or industry, such as chemical plants.

The degree of selectivity of a membrane depends on the membrane pore size. Depending on the pore size, they can be classified as forward osmosis (FO) membranes, microfiltration (MF), ultrafiltration (UF), nanofiltration (NF) and reverse osmosis (RO) membranes. Membranes can be neutral or charged, and particle transport can be classified as active transport or passive transport. Active transport of permeate can be facilitated by pressure, concentration, chemical or electrical gradients of the membrane process. Reverse osmosis membranes require pressure to move solvents in a direction opposite that of natural osmosis.

Electrically charged membranes can be dense or microporous, but are most commonly microporous with pore walls that carry fixed positively or negatively charged ions. A membrane with positively charged ions is referred to as an anion-exchange membrane because it binds anions in the surrounding fluid. Similarly, a membrane containing negatively charged ions is called a cation-exchange membrane. In a cation-exchange membrane, the fixed anions are in electrical equilibrium with mobile cations in the interstices of the polymer. On the contrary, the mobile anions are more or less completely excluded from the cation-exchange membrane because of their electrical charge, which is identical to that of the fixed ions.

Membrane separation with a charged membrane interface is achieved primarily by exclusion of ions of the same charge as the fixed ions of the membrane structure, and to a much lesser extent by the pore size. Due to the exclusion of the anions, a cation exchange membrane permits transfer of cations only. Anion exchange membranes carry positive charges fixed on the polymer matrix. Therefore, they exclude all cations and are permeable only to anions.

Membrane distillation is a thermally driven separation process using phase changes to separate materials. Membranes for distillation are hydrophobic in nature and heating the feed fluid to vaporize the water is used to separate the water from solutes, such as salt. The membrane acts as a barrier for the liquid phase (water), while allowing the vapor phase to permeate through the membrane. Materials that are not vaporized, such as salt or other solutes, do not pass through the membrane and are retained outside the membrane away from the permeated collected vapor. Coolant is used to return the permeated vapor to the liquid phase following the separation.

The advent of advanced membranes for water desalination within the last two decades and subsequent technological breakthroughs in design has increased membrane energy efficiency and performance. As a result, it is possible to produce higher quality potable water from saline water.

Membrane Systems

Conventional water treatment applications that employ flat-sheet membrane separation technologies, such as membrane bioreactors (MBR), forward osmosis (FO) systems, or membrane distillation (MD) systems, use flat membrane modules containing several layers of flat plate-and-frame membrane elements. Each membrane element is composed of a single rectangular membrane plate-and-frame (usually made of plastic) on which a rectangular sheet membrane is fixed around the edges on each side of the plate, creating a lumen space where filtered water runs. Flat-sheet membrane modules can be submersible or non-submersible modules.

Submersible membrane modules are fully assembled devices used in fluid treatment by inserting the module inside a tank containing the fluid to be treated. The fluid is treated by passing it through one or more active membrane layers. The module has inlet and outlet connections for different fluids to enter and leave the module. Non-submersible membrane modules are fully assembled devices used in fluid treatment in which membrane plate and frame are arranged in a housing having an inlet port for receiving untreated fluid, and an outlet port for providing treated fluid that has passed through the membrane, and possibly a further outlet port for untreated fluid that did not pass through the membrane.

A membrane element is a single subunit of the membrane module that includes two sheets of membrane attached to a central core called the membrane plate and frame. Connecting one or more membrane elements to the inlet and outlet connections of one of more fluid streams forms a single membrane module.

Flat sheet membranes are the active ultra-thin layers used in fluid treatment applications. The membrane acts as a semipermeable barrier between the treated and the untreated fluids, through which only selected molecules can pass, using physical and chemical separation techniques. The membrane sheet is fixed on the membrane plate and frame and with the edges sealed against leakage to or from the central frame of the membrane plate and frame. Flat Sheet refers to the flat membrane surface, as opposed to spiral wound membrane modules or hollow-fiber membranes.

Active (or effective) membrane area is the total area of the membrane sheet that is in direct contact with the targeted fluid(s). This area excludes the membrane area fixed to the membrane plate and frame, which does not have a direct contact with the targeted fluids and does not contribute to the treatment.

The area of the membrane that is fixed to the membrane plate and frame is the inactive membrane area. This area includes the edges of the around the membrane that are attached to the frame and are not part of the fluid treatment.

Membrane packing density is the total active membrane area enclosed inside the membrane module normalized to the unit area that the module occupies. The membrane packing density is usually measured in square meters of active membrane area per square meters of spatial area that the module occupies. The higher the packing density, the greater the production capacity of a module.

There are two problem areas in the conventional water treatment membrane separation technology: low membrane packing density and large inactive membrane areas. The conventional membrane plate design limits the active membrane area due to low membrane-packing density, eventually making it unfeasible in niche applications, such as the treatment of produced water from oil and gas industries using forward osmosis or membrane distillation. The conventional design also causes significant loss of active membrane area due to the deactivation of membrane area caused by fixing the edges of the membrane sheets on several membrane elements used in a single module. Fixing the edges is essential to maintain separation of permeate from the untreated fluid, however, this also results in a decrease in the effective membrane area available for a flat sheet membrane.

SUMMARY OF THE INVENTION

A corrugated membrane plate and frame module for use in fluid treatment applications is disclosed, where the corrugated design increases production capacity of a submersible module by more than 200% as compared to conventional submersible modules. The corrugated membrane plate and frame module can be a submersible or non-submersible module. The increase is achieved by tripling the membrane packing density per module using an optimized corrugated design. The disclosed corrugated membrane plate and frame also reduces the inactive membrane area per module, which is caused by deactivation of membranes edges attached to the plate and frame core in order to prevent leakage.

According to an embodiment, there is a water treatment device comprising a corrugated membrane plate and frame core having parallel rows of folds, and comprising a corrugated frame with a corrugated bottom frame member, a corrugated top frame member, a vertical left side frame member, and a vertical right side frame member, said frame having a front side, a back side, a bottom side, a top side, and said bottom, top, left, and right frame members defining an open central area; a first corrugated membrane sheet with a top edge, a bottom edge, a left side edge and a right side edge attached to the front side of the corrugated frame along the top, bottom, left, and right frame members; a second membrane sheet with a top edge, a bottom edge, a left side edge and a right side edge attached to the back side of the corrugated frame along the top, bottom, left, and right frame members; said first and second membrane sheets forming a membrane lumen space in the open central area of the corrugated frame for collecting a permeated fluid, said corrugated membrane plate and frame core being sealed to prevent a fluid to be treated from entering the membrane lumen space without passing through one of the first and second corrugated membrane sheets, and an area of said first and second membrane sheets being formed that is coextensive with the membrane lumen space and provides an active membrane area where the top, bottom, left, and right edges of the first and second membrane sheets attached to the frame are inactive membrane areas; a fluid outlet manifold attached to a top side of the top frame member of the corrugated membrane plate and frame core, said fluid outlet manifold having an interior space that receives permeated fluid from the membrane lumen space via one or more openings in the top frame member, and a fluid outlet port for removing the permeated fluid from the interior space of the fluid outlet manifold; and a base attached to a bottom side of the bottom frame member of the corrugated membrane plate and frame core The device base can comprise a gas inlet manifold having an interior space for receiving a gas, a gas inlet port, and a plurality of gas outlets on a top surface of the gas inlet manifold positioned to discharge the gas adjacent to an exterior of the corrugated membrane plate and frame core, said gas inlet manifold and said gas outlets being isolated from the membrane lumen space. The gas can be air or other suitable noble or stable gases, such as nitrogen, oxygen, saturated carbon-dioxide, unsaturated carbon-dioxide, and various other types of stable gases.

The base can further comprise a fluid inlet manifold attached to the bottom frame member, wherein a portion of the bottom frame member extends through the gas inlet manifold to contact the fluid inlet manifold while maintaining isolation from the gas in the gas inlet manifold interior space, said fluid inlet manifold having an interior space for receiving a fluid, a fluid inlet port, and one or more openings on a top surface adjacent to a plurality of openings in the bottom frame member through which fluid from the fluid inlet manifold can flow into the membrane lumen space of the corrugated membrane plate and frame core. The fluid can be a draw fluid or a coolant fluid.

The device may also have a spacer selected from a perforated membrane plate and a non-woven mesh spacer sheet that is positioned in the membrane lumen space between the first and second membrane sheets. The spacer may or may not be attached to the frame members.

Membrane sheets for the device can be forward osmosis membranes, reverse osmosis membranes, membrane distillation membranes, nanofiltration membranes, microfiltration membranes, or ultrafiltration membranes. The fluids to be treated can be saline water, brackish water, domestic wastewater, industrial wastewater, produced water, pharmaceutical fluids, and food and beverage fluids. The active area of the corrugated membrane sheets in the corrugated membrane plate and frame core is 100% to over 250% (e.g., 414% or 933%) greater than an active membrane area of a flatsheet plate and frame module having an equivalent height, width and depth.

The disclosed membrane module can be made of a low-cost corrosion/chemical-resistant light-weight material, preferably PVC. The module can be manufactured using 3D printing, injection molding, thermal forming and pressing, or combinations of these techniques to produce the individual components or combined components, such as a frame core. For either embodiment, the membrane sheets can be attached on the central corrugated plate and frame using strong chemically resistant adhesives, such as epoxy. Any type of membrane sheet that can be conformed to the corrugated shape and attached to the frame may be employed in the disclosed module; however, the type of membrane sheets utilized will vary depending on the specific type of treatment application. For example, a forward osmosis process would require a different membrane than one used for membrane distillation.

The membrane module, with or without a draw fluid inlet manifold, can be used in applications where two different fluid streams should be separated by membrane sheets, such as forward osmosis or membrane distillation, or alternatively, can be used in wastewater treatment applications where membrane bioreactors or other membrane separation processes are used to treat a single fluid, with or without using vacuum on the permeate collection side of the module.

This module has an inlet and outlet for a single fluid that moves inside the module in total isolation from the outside fluid to which the module is exposed. The clean draw fluid (in forward osmosis) or coolant (in membrane distillation) runs through the lumen space created by the two sheets of membrane attached to the corrugated membrane plate and frame while the module is exposed to the lower-salinity feed fluid (wastewater). If the module is a submersible module, the module can be submerged in a tank containing the lower-salinity feed fluid and if the module is a non-submersible module, the lower-salinity feed fluid is provided to an inlet port of a housing of the module. The draw fluid or coolant induces the permeation of water through the membranes. Negative pressure, via vacuum or suction, can be used to facilitate movement of the draw fluid or coolant into the module and for removal of permeated materials from the fluid outlet manifold.

Alternatively, the membrane module, without a draw fluid manifold, can be used in water treatment applications such as reverse osmosis membranes, nanofiltration membranes, microfiltration membranes, ultrafiltration membranes and combinations of membranes can be utilized for MBR applications. A single outlet port located in the fluid outlet manifold at the top of the module is used to withdraw clean water permeated through the membrane from the wastewater to which the module is exposed.

According to another embodiment, there is a method for treating water comprising the steps of: a) providing a water treatment device having a corrugated membrane plate and frame core that comprises: (i) a corrugated frame with a corrugated bottom frame member, a corrugated top frame member, a vertical left side frame member, and a vertical right side frame member, said frame having a front side, a back side, a bottom side, a top side, and said bottom, top, left, and right frame members defining an open central area; (ii) a first corrugated membrane sheet with a top edge, a bottom edge, a left side edge and a right side edge attached to the front side of the corrugated frame along the top, bottom, left, and right frame members; (iii) a second membrane sheet with a top edge, a bottom edge, a left side edge and a right side edge attached to the back side of the corrugated frame along the top, bottom, left, and right frame members; said first and second membrane sheets forming a membrane lumen space in the open central area of the corrugated frame for collecting a permeated fluid, said corrugated membrane plate and frame core being sealed to prevent a fluid to be treated from entering the membrane lumen space without passing through one of the first and second corrugated membrane sheets, and an area of said first and second membrane sheets being formed that is coextensive with the membrane lumen space and provides an active membrane area where the top, bottom, left, and right edges of the first and second membrane sheets attached to the frame are inactive membrane areas; (iv) a fluid outlet manifold attached to a top side of the top frame member of the corrugated membrane plate and frame core, said fluid outlet manifold having an interior space that receives permeated fluid from the membrane lumen space via one or more openings in the top frame member, and a fluid outlet port for removing the permeated fluid from the interior space of the fluid outlet manifold; and (v) a base attached to a bottom side of the bottom frame member of the corrugated membrane plate and frame core; b) providing a conduit for removal of permeated fluid from the fluid outlet manifold via the fluid outlet port; c) applying a suction or negative pressure to the fluid outlet port; d) exposing the water treatment device to the fluid to be treated; and e) removing the permeated fluid from the fluid outlet manifold via the fluid outlet port by delivering a gas to the gas inlet manifold.

The method steps may further comprise providing a gas inlet manifold as the base, said gas inlet manifold having an interior space for receiving a gas, a gas inlet port for delivering a gas to the gas inlet manifold, a conduit to deliver the gas to the gas inlet port, and a plurality of gas outlets on a top surface of the gas inlet manifold positioned to discharge the gas adjacent to an exterior of the corrugated membrane plate and frame core in isolation from the membrane lumen space, and delivering a gas to the gas inlet manifold, wherein the gas is discharged from the plurality of gas outlets providing a scouring action to the exterior of the corrugated membrane plate and frame core.

The method steps may also further comprise providing a fluid inlet manifold attached to the bottom frame member, said fluid inlet manifold having an interior space for receiving a fluid, a fluid inlet port, and an opening on a top surface adjacent to a plurality of openings in the bottom frame member which allow the fluid to flow into the membrane lumen space of the corrugated membrane plate and frame core, and said gas inlet manifold is positioned between the fluid inlet manifold and the bottom frame member, said gas being maintained in isolation from the fluid manifold and the membrane lumen space of the corrugated membrane plate and frame core; providing a conduit to deliver a fluid to the fluid inlet manifold via the fluid inlet port; and delivering a draw fluid or a coolant fluid to the fluid inlet manifold, said draw fluid or coolant fluid enhancing movement of permeated fluid into the membrane lumen space.

According to a further embodiment, there is a water treatment device comprising: a corrugated membrane plate and frame core comprising: a corrugated frame with a corrugated bottom frame member, a corrugated top frame member, a vertical left side frame member and a vertical right side frame member; a first corrugated membrane sheet attached to a front side of the top, bottom, left side, and right side frame members; a second membrane sheet attached to a back side of the top, bottom, left and right frame members, wherein the first and second membrane sheets form a membrane lumen space that is sealed to prevent fluid to be treated from entering the membrane lumen space without passing through one of the first and second corrugated membrane sheets; a fluid outlet manifold attached to a top side of the top frame member, said fluid outlet manifold having an interior space that receives permeated fluid from the membrane lumen space via one or more openings in the top frame member of the frame and a fluid outlet port for removing the permeated fluid from the interior space of the fluid outlet manifold; a fluid inlet manifold attached to the bottom frame member, said fluid inlet manifold having an interior space for receiving a fluid, a fluid inlet port, and one or more openings on a top surface adjacent to a plurality of openings in the bottom frame member that allows the fluid to flow into the membrane lumen space of the corrugated membrane plate and frame core; and a gas inlet manifold positioned between the fluid inlet manifold and the bottom frame member having an interior space for receiving a gas, a gas inlet port, and a plurality of gas outlets on a top surface of the gas inlet manifold positioned to discharge the gas adjacent to an exterior of the first and second membranes, said gas inlet manifold and said gas outlets being isolated from the membrane lumen space.

Membrane sheets for the device utilized in the disclosed methods can be forward osmosis membranes, reverse osmosis membranes, membrane distillation membranes, nanofiltration membranes, microfiltration membranes, or ultrafiltration membranes. The fluids to be treated according to the method can be saline water, brackish water, domestic wastewater, industrial wastewater, produced water, pharmaceutical fluids, and food and beverage fluids. The device utilized in method has a production capacity that is 100% to over 250% greater (e.g., 414% or 933%) than a flatsheet plate and frame module having an equivalent height, width and depth.

The details of one or more embodiments are set forth in the description below. As used throughout, the methods are described for use in water treatment systems, but the methods described in the present invention may also be useful in other fluid separation systems. Other features, objects, and advantages will be apparent from the description and from the claims.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which.

DETAILED DESCRIPTION

Figures 1, 2:
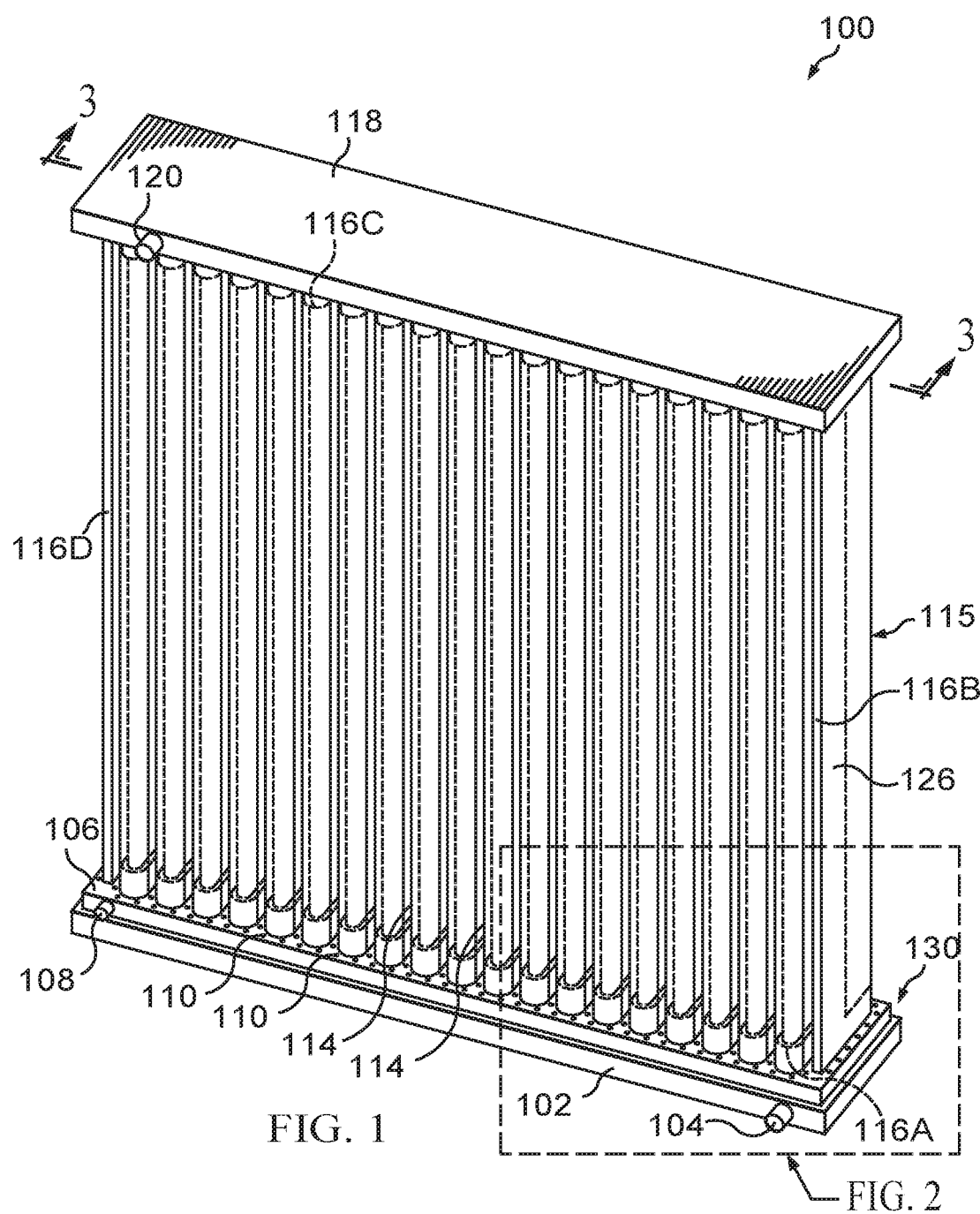
FIG. 1 is a front perspective view of a corrugated submersible membrane module.
FIG. 2 is an enlarged view of the FIG. 1 base.
Figure 2:
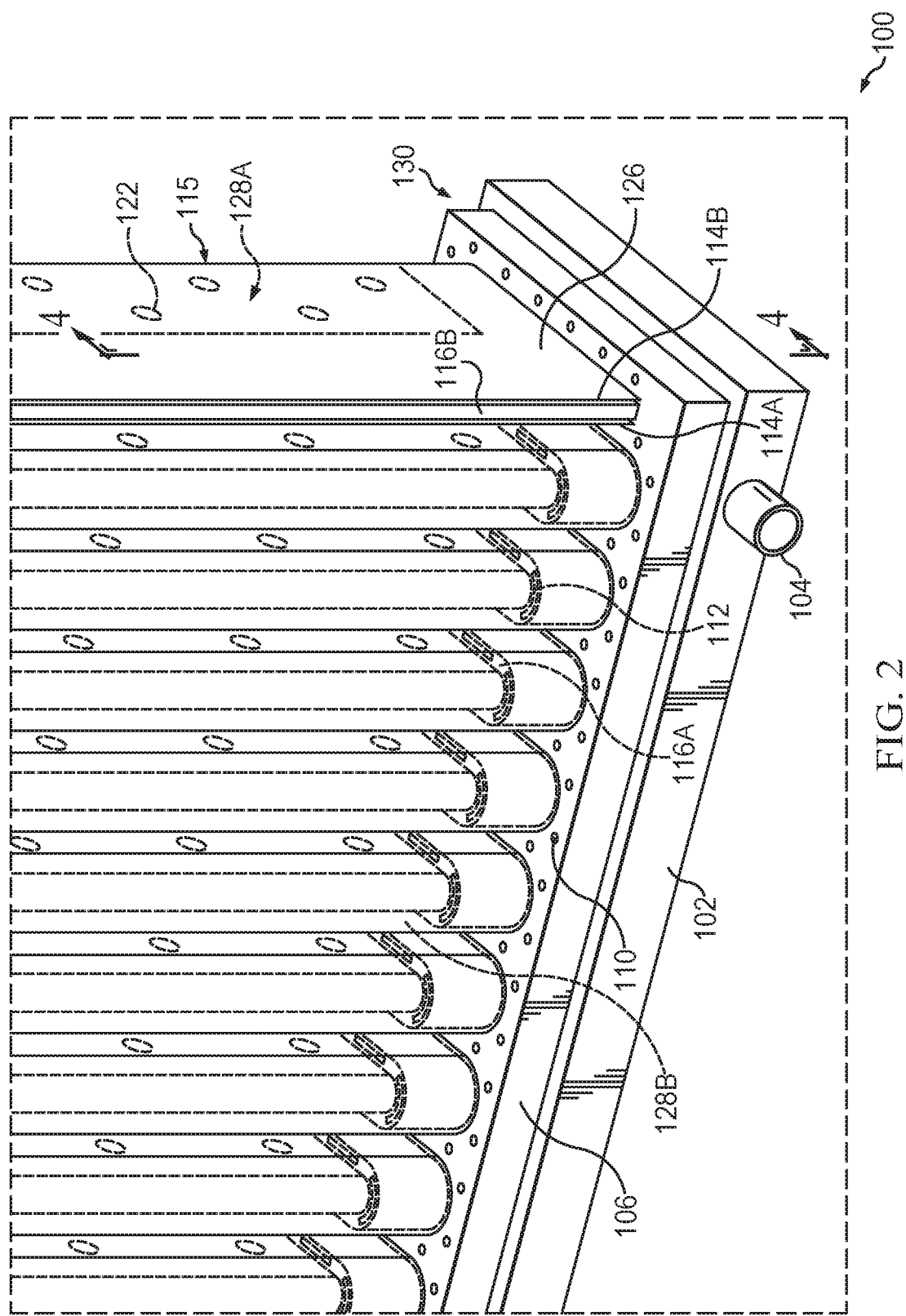

The disclosed invention is a new design for a corrugated plate and frame membrane modules used in fluid treatment applications, which can increase the production capacity of modules by more than 200% (e.g., up to 414% or 933%) as compared to conventional flat sheet modules. The increase in capacity is achieved using an optimized corrugated design requiring fewer individual membrane sheets and tripling the membrane packing density per module. The disclosed corrugated membrane design not only triples the active area for the module's production capacity, but because fewer individual membrane sheets are required, inactive membrane area per module is reduced since there is less deactivated area where the edges of the membrane sheet are attached to the plate and frame core.

The disclosed corrugated membrane plate and frame is utilized in a submersible membrane module by inserting the module inside a tank containing the fluid to be treated. The fluid is treated by passing it through one or more active membrane layers into a lumen space. The module has an inlet and outlet connections for different fluids to enter and leave the module. The disclosed corrugated membrane plate and frame is utilized in a non-submersible membrane module by providing the fluid to be treated to an input port of a housing of the module. The fluid is treated by passing it through one or more active membrane layers into a lumen space. The module has an inlet and outlet connections for different fluids to enter and leave the module.

Membranes suitable for the disclosed application are ultra-thin semipermeable barriers between treated and untreated fluids, through which only selected molecules can pass. The membranes use physical and chemical separation techniques for fluid treatment applications. The membrane sheets are attached to the corrugated membrane plate and frame and the edges of the membrane sheets are sealed against leakage to or from the membrane lumen space in the central frame area of the corrugated membrane plate and frame.

The corrugated membrane has an active membrane area (i.e., the total area of the membrane sheet in direct contact with the targeted fluids), which excludes the inactive membrane area attached to the membrane plate and frame.

The corrugated membrane design provides high membrane packing density by utilizing a corrugated shape for the membrane sheets to increase the total active membrane area enclosed inside the membrane module with less membrane area inactivated due to attached edges. The corrugated membrane plate and frame provides the increased membrane packing density in the same footprint as a conventional flatsheet plate and frame unit.

Since the disclosed corrugated membrane design dramatically reduces the number of membrane elements per module, the total deactivated membrane area is less, hence less material is wasted and manufacturing costs should be reduced. There are numerous technological fields where the disclosed invention can be used, including forward osmosis or membrane distillation applications for seawater desalination, dilution of saline water, dilution of brackish water, pretreatment applications, water recovery from impaired quality water sources such as domestic and/or industrial wastewater, produced water treatment, reduction of wastewater volumes, zero liquid discharge applications, salt production, food and beverage concentration, and pharmaceutical applications.

In forward osmosis and membrane distillation applications, the first embodiment of the invention can be submerged into a tank containing feed water (wastewater, produced water, dilute beverage, or any impaired quality water), and the draw fluid (in forward osmosis) or coolant (in membrane distillation) can be circulated inside the module using a suction pump applied to the fluid outlet port circulating the draw fluid or coolant using negative pressure only. Positive pressure is not be applied to the module's inlet port.

In wastewater treatment systems such as membrane bioreactors (MBR), the second embodiment of the invention can be used by inserting the module into a tank containing wastewater with suction (negative pressure) applied on the single fluid outlet port located at the top of the module to facilitate permeation of water through the membrane to produce a treated effluent. Nanofiltration membranes, microfiltration membranes, ultrafiltration membranes and combinations of membranes can be utilized for MBR applications. Input and circulation of a draw fluid or coolant is not required for this type of treatment application.

The design of the disclosed corrugated membrane module has substantial advantages over conventional flat sheet plate and frame modules. By increasing the active surface area per module by more than 200% with no decrease in the filtration efficiency, the production capacity of the module triples, without increasing the footprint of the system or requiring major retrofitting. The production capacity of the disclosed corrugated membrane plate and frame design is compared herein to equivalently sized commercially available flatsheet modules in order to compare production efficiency on a uniform scale; however, the corrugated membrane plate and frame design can be sized up or down depending on the specific treatment application, and is not limited to a single unit size.

Increasing the effective (active) membrane area is achieved by an optimized corrugated core integrating corrugated membranes into plate and frame water treatment modules. This optimized corrugated core acts as the membrane plate and frame having a membrane sheet attached to each side of the plate, with the membrane conforming to the shape of the corrugated plate and frame core. The corrugated membrane plate and frame design is optimized to triple module production capacity compared to conventional designs while ensuring ease of manufacturing the membrane modules on an industrial scale without imposing complexity that could increase fabrication cost.

The disclosed corrugated membrane design reduces the number of membrane elements per module, thereby reducing the deactivated (attached) membrane area per module in comparison to conventionally designed flatsheet modules.

As seen in the FIG. 1 embodiment, the submersible membrane module (100) has a corrugated membrane (114) attached to a corrugated membrane plate frame (116) encompassing the bottom, sides and top (116A-116D) of the open frame. In this view, the edges of the vertical portions of the side frame members (116B, 116D) are visible, and the horizontal members of the bottom and top frame members (116A and 116C, seen here beneath membrane 114) would be covered by membrane sheets (114) on the front and back sides of the frame. The corrugated membranes (114) have attached edges (126) along the surfaces of the frame (116) forming a corrugated membrane plate and frame core (115) having all edges of the membranes (114) sealed to the frame (116) to prevent leakage of the surrounding submersing fluid into the membrane lumen space of the membrane plate and frame core (115).

The membrane plate and frame core (115) is affixed to a base (130) having a draw fluid inlet manifold (102) and a gas inlet manifold (106), and the corrugated membrane plate and frame core (115) is capped by a fluid outlet manifold (118). The draw fluid in the draw fluid manifold (102) and fluid in the fluid outlet manifold (118) are completely isolated from the surrounding fluid in which the submersible membrane module (100) is submersed. The draw fluid inlet manifold (102) has a draw fluid inlet port (104) and the fluid outlet manifold (118) has a fluid outlet port (120). In use, negative pressure (or suction) applied at the fluid outlet port (120) allows a draw fluid (or coolant) to flow into the draw fluid manifold (102) through the draw fluid inlet port (104) via a conduit, such as a hose or tube, (not shown) attached to the draw fluid inlet port (104). The draw fluid, along with permeate (filtered water) that passed through the membrane, exits the submersible membrane module (100) through the fluid outlet port (120) via a conduit, such as a tube or pipe (not shown).

The gas inlet manifold (106) has a gas inlet port (108) for the input of a gas, such as air, via a conduit, such as a tube or pipe (not shown). A plurality of gas outlets (110) in the gas inlet manifold (106) are positioned adjacent to the exterior of the corrugated membrane plate and frame core (115) and discharge scouring gas bubbles over the exterior surface of the membranes (114). Gas in the gas inlet manifold (106) is isolated from both the fluid in the draw fluid manifold (102) and the permeated water inside the core. In a second embodiment, a draw fluid, and therefore a draw fluid inlet manifold (102), is not required, in which case, the gas inlet manifold (106) forms the base (130) of the submersible membrane module (100).

FIG. 2 is an enlarged view of the bottom right corner of the submersible membrane module (100) in FIG. 1. As seen in FIG. 2, the membrane and frame core (115) includes a corrugated frame (116) having membrane sheets (114A, 1146) attached to each side of the frame, as seen with the vertical edge of the side frame member (116B) positioned between the two membrane sheets (114A, 114B). The membrane sheets (114A, 1146) are corrugated to fit along the corrugated frame members (116A) and the membranes have edges (126) sealed around all of the frame (116) to prevent surrounding fluid from entering the area inside the core without passing through one of the first and second corrugated membrane sheets (114A, 114B). The active membrane area (128A) is the area of the membrane that is not sealed to the frame (116) and is the active area for osmosis from the surrounding fluid. Water from the surrounding fluid permeates (passes through) the active area (128A) of the membranes into the membrane lumen space (128B) between the active areas of the two membranes (114A, 114B).

Draw fluid flows from the draw fluid manifold (102) and enters the membrane lumen space (128B) through inlet openings (112, seen here behind the front membrane) in the bottom frame member (116A). The membrane plate and frame core (115) can also have a perforated spacer plate (122) situated in the membrane lumen space (128B) between the two membrane sheets (114A, 114B) providing separation between the active areas of the two sheets of membrane and enhancing turbulence of fluid traveling in the membrane lumen space (128B) of the submersible membrane module (100). The perforated spacer plate (122) may contain protrusions, for example small spheres or dimples, on each side of the perforated spacer plate (122), which create channels for fluid movement between each membrane layer and the spacer plate by pushing the membrane layer away from the perforated spacer plate (122). The perforated spacer plate (122) is in contact with the effective area (128A) of the membrane in the membrane plate and frame core (115), but is not attached (e.g., affixed or glued) to the membrane but is attached (e.g., affixed or glued) to the frame. In other embodiments, the perforated spacer plate (122) is not attached to the membrane or to the frame. The spacer plate (122) may take the form of a non-woven mesh-type spacer.

The base (130) of the unit includes two manifolds—the draw fluid manifold (102, seen with draw fluid inlet port 104) and the perforated gas inlet manifold (106), which is situated above the draw fluid inlet manifold (102). The perforated gas inlet manifold (106) has gas outlets (110) for the discharge of gas bubbles for scouring of the membrane surfaces (114A, 114B) by air or another gas. Other self-cleaning or turbulence promoting techniques can also be employed. The gas bubbles are discharged from the plurality of outlets (110) distributed on the surface of the gas inlet manifold adjacent the outer surface of each membrane sheet (114A, 114B) of the membrane plate and frame core (115). In some applications, a draw fluid, and therefore a draw fluid inlet manifold (102), is not required. In such an embodiment, the gas inlet manifold (106) forms the base (130) of the submersible membrane module (100). The gas can be air or other suitable noble or stable gases, such as nitrogen, oxygen, saturated carbon-dioxide, unsaturated carbon-dioxide, and various other types of stable gases.

Figure 3:
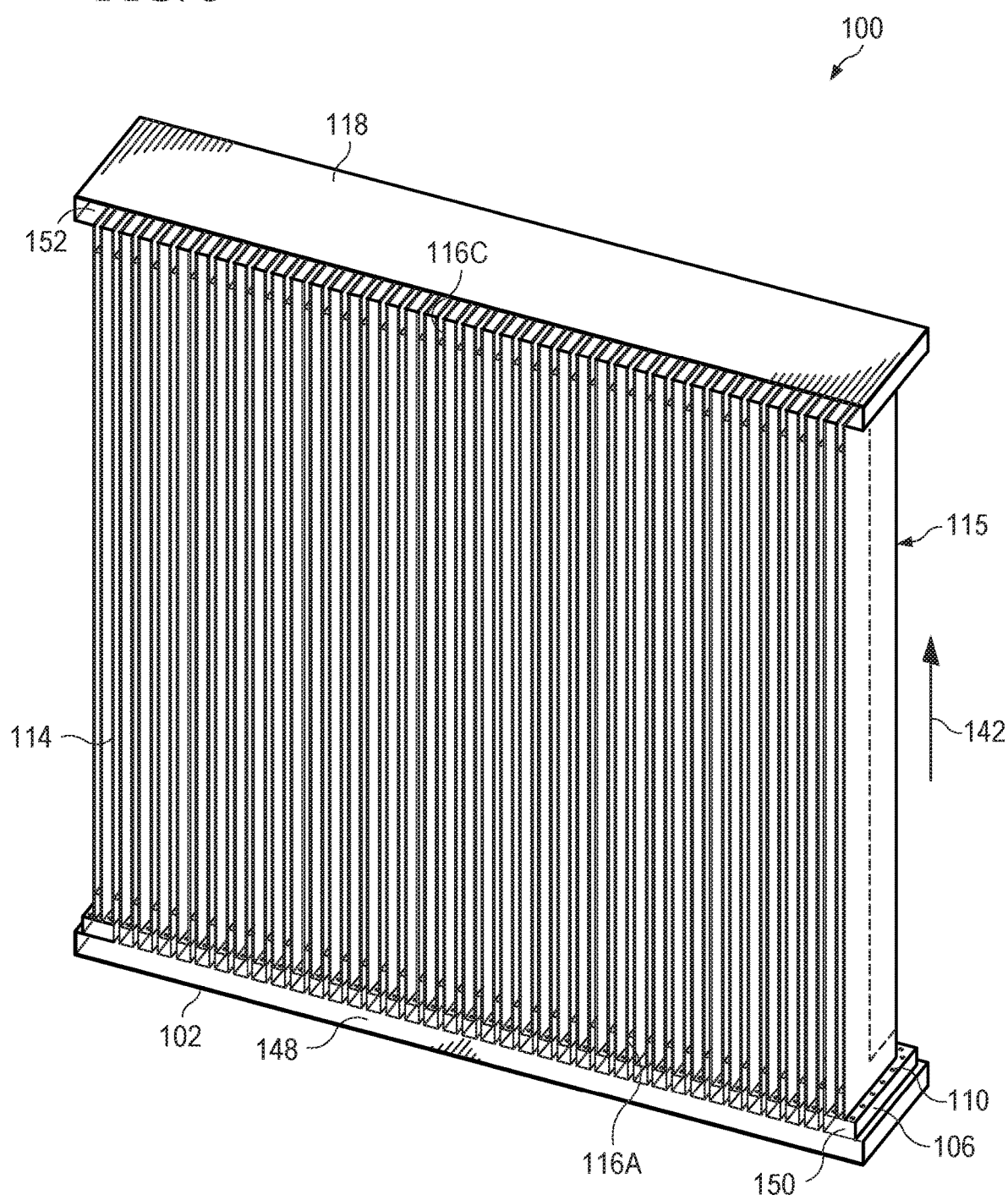
FIG. 3 is a cross-section view of FIG. 1 along line 3-3.
Figure 4:
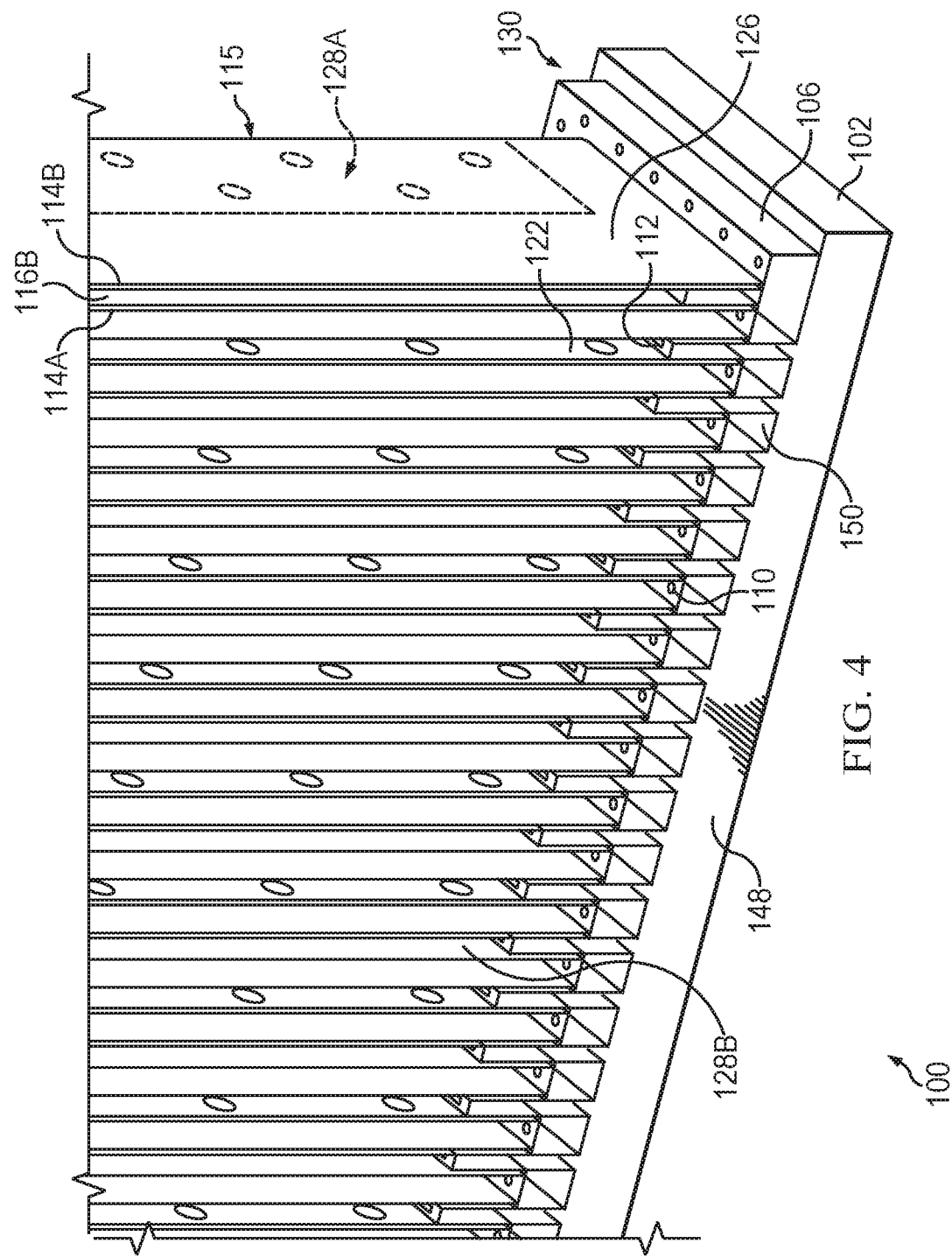
FIG. 4 is a cross-section view of FIG. 2 along line 4-4.

Cross-sections of the submersible membrane module (100) are shown in FIGS. 3 and 4, illustrating how the corrugated membrane plate and frame core (115) is attached (e.g., welded) to the draw fluid inlet manifold (102) located at the base (130) of the module providing a fully sealed path for the draw fluid without risking leakage of the submersing fluid into the gas manifold (106). The gas inlet manifold (106), located directly below the membrane plate and frame core (115), is completely isolated from the draw fluid inlet manifold (102) located underneath.

FIG. 3 is a cross-section of FIG. 1 along line 3-3 showing a vertical cross-section of the entire submersible membrane module (100). The draw fluid inlet manifold (102) has an interior space (148) where draw fluid flows across the length of the manifold. Draw fluid moves upward though openings in the bottom frame member (116A) to enter the membrane lumen space (128B) of the membrane and frame core (115) traveling in an upward direction (142) and exiting the membrane lumen space (128B) through frame outlets in the top frame member (116C) to reach the interior space (152) of the fluid outlet manifold (118). Fluid collected in the fluid outlet manifold (118) can be removed via an outlet port (not shown). The collected fluid can be draw fluid, permeate or a draw fluid/permeate mixture. In membrane distillation applications, coolant is used instead of draw fluid.

The gas inlet manifold (106) has an interior space (150) where gas entering the manifold flows across the length of the manifold and is discharged through a plurality of gas outlets (110). The plurality of gas outlets (110) are distributed across the top surface of the gas inlet manifold (106) adjacent the outside area of the membrane and frame core (115). The gas inlet manifold (106) is located directly below the membrane plate and frame core (115) and is completely isolated from the draw fluid inlet manifold (102).

FIG. 4 is a cross-section of FIG. 2 along line 4-4 showing a vertical cross-section of the enlarged bottom right portion of the module (100). The draw fluid inlet manifold (102) has an interior space (148), which allows for flow of the draw fluid across the width of the manifold and one or more openings in the draw fluid inlet manifold that is adjacent to openings in the bottom frame member (116A). The bottom frame member (116A) is attached (e.g., welded) to the draw fluid manifold (102) and has frame inlet openings (112) providing a path for draw fluid to move from the draw fluid manifold (102), though the frame inlet openings (112), and into the membrane lumen space (128B) of the membrane plate and frame core (115). Draw fluid and fluid permeated from the surrounding fluid then travels in an upward direction toward the fluid outlet manifold (not shown), entering the fluid outlet manifold via frame outlet openings (similar to 112) in the top frame member.

As see in FIG. 4, the gas inlet manifold (106) is positioned between the draw fluid manifold (102) and the bottom frame member (116A), but is isolated from both the draw fluid manifold (102) and the bottom frame member (116A). A portion of the bottom frame member (116A) passes through the gas inlet manifold (106) to contact the top of the draw fluid manifold (102) and the two pieces are attached (e.g., welded together). The gas inlet manifold (106) has an interior space (150) that allows scouring gas bubbles to be discharged from the plurality of gas outlets (110) on the gas inlet manifold (106) into the area outside of the membrane plate and frame core (115). The distribution of the plurality of gas outlets (110) follows the corrugation pattern of the membrane plate and frame core (115) such that gas outlets (110) release bubbles around the outside base of both membrane sheets (114A, 114B) attached to the frame members (116A and 116B visible in this view), but do not release bubbles into the membrane lumen space (128B).

The membrane sheets (114A, 114B) have edges sealed (126) to the frame members (116A, 1168, seen here) that prevent leakage of the surrounding fluid into the membrane lumen space (128B) and maintain separation of permeate and draw fluids (or coolant) from the surrounding fluid. The effective membrane area (128A) begins where the sealed edges (126) end. The membrane plate and frame core (115) can also have a perforated spacer plate (122) situated in the membrane lumen space (128B) between the two membrane sheets (114A, 114B) providing separation between the active areas of the two membrane sheets and enhancing turbulence of fluid traveling in the membrane lumen space (128B) of the membrane and frame core (115) in the submersible membrane module (100). The spacer is in contact with the effective (active) area (128A) of the membrane in the membrane plate and frame core (115), but is not attached (e.g., glued or adhered) to the membranes or the frame. The spacer may be a perforated spacer plate with protrusions or may take the form of a non-woven mesh-type spacer. In applications where a spacer is not required or desired, the spacer may be omitted from the submersible membrane module (100).

Figure 5:
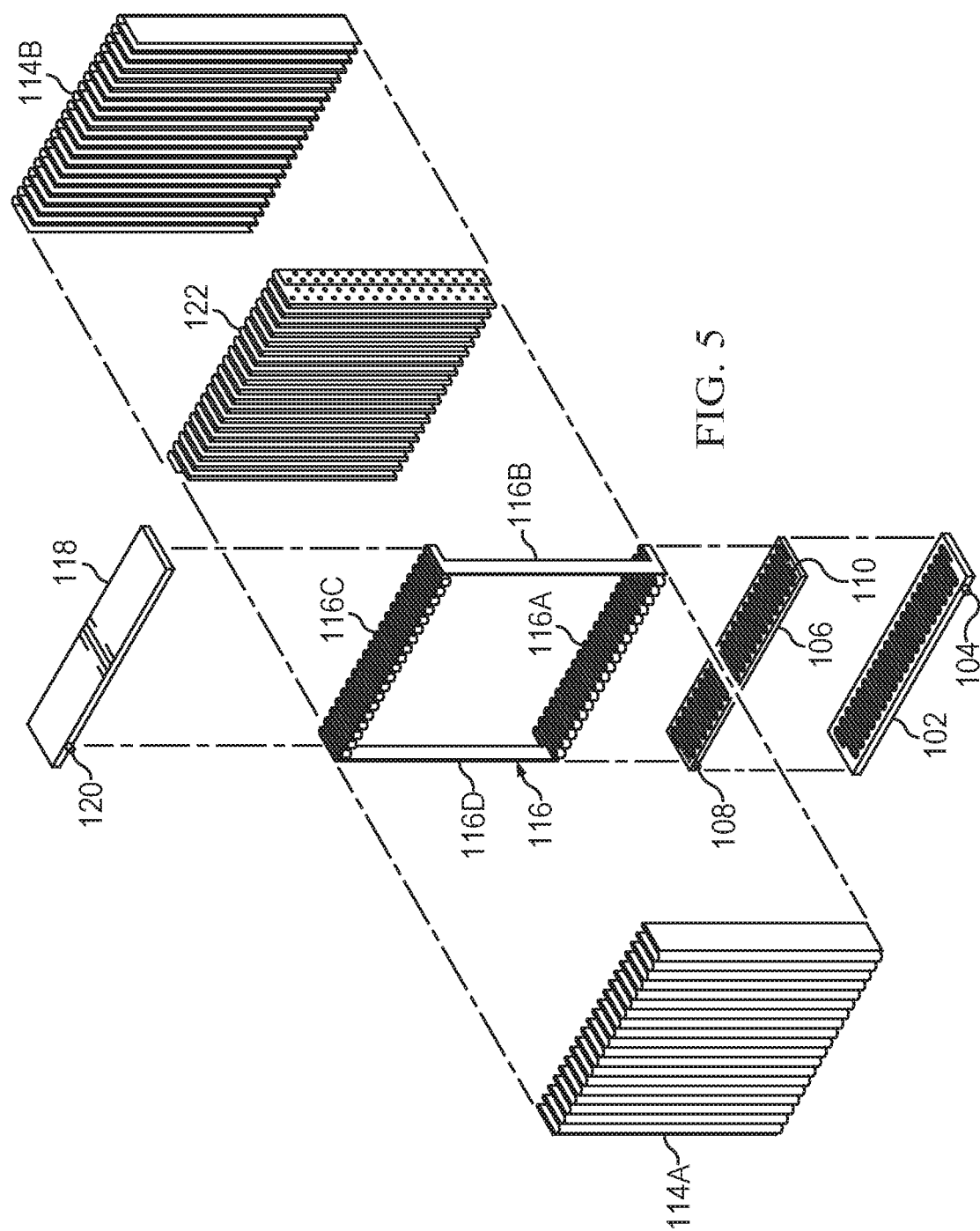
FIG. 5 is an exploded view of the submersible corrugated membrane plate and frame module.

FIG. 5 is an exploded view of the submersible membrane module, showing the elements compromising the module. The corrugated frame (116) has a corrugated bottom frame member (116A), right and left vertical side frame members (116B, 116D) and a corrugated top frame member (116C) on which membrane sheets are attached using adhesives or any other fixing mechanism that completely seals the membrane sheets with the core. The membrane sheets (114A, 1146) have a corrugated shape corresponding to the shape of the corrugated frame (116). The edges of the first membrane sheet (114A) are attached to the front side of the frame (116) and the edges of the second membrane sheet (114B) are attached to the back side of the frame (116) forming the corrugated membrane plate and frame core. A perforated spacer plate (122) with protrusions may be positioned in the membrane lumen space between the two membrane sheets (114A, 114B), is not attached to the membrane sheets but is attached to the frame (116). In other embodiments, the perforated spacer plate (122) is not attached to the membrane or to the frame. The perforated spacer plate (122) provides separation between the membrane sheets and enhances turbulence of fluid traveling in the membrane lumen space. Alternatively, the spacer plate (122) may take the form of a non-woven mesh-type spacer. In applications where a spacer is not required or desired, the spacer may be omitted from the submersible membrane module (100).

The draw fluid inlet manifold (102) at the base of the module is secured to the bottom frame member (116A). The draw fluid inlet manifold (102) has a draw fluid inlet port (104) positioned on one side of the manifold. This draw fluid manifold (102) is used in applications requiring the introduction of a second fluid inside the module in isolation from the fluid in which the module is submerged, i.e., the fluid to be treated. Such applications include, but are not limited to, forward osmosis draw fluid and membrane distillation coolant fluid. In applications without a draw fluid manifold (102), the gas inlet manifold (106) forms the base of the unit.

The gas inlet manifold (106) is positioned between the draw fluid inlet manifold (102) and the bottom frame member (116A), with the gas isolated from both the draw fluid manifold (102) and inside the bottom frame member (116A). A portion of the bottom frame member (116A) passes through the gas inlet manifold (106) to contact the draw fluid inlet manifold (102). The gas inlet manifold (106) has a gas inlet port (108) allowing a gas to enter the gas manifold and has a plurality of gas outlets (110) on the top surface of the manifold allowing gas to the be discharged.

The fluid outlet manifold (118) caps the membrane (114A, 114B) and frame (116) core, and providing a collection space for draw fluid and/or permeate leaving the space between the membranes. The fluid outlet manifold (118) has a fluid outlet (120) for the draw fluid and/or permeate to exit the manifold.

Figure 6:
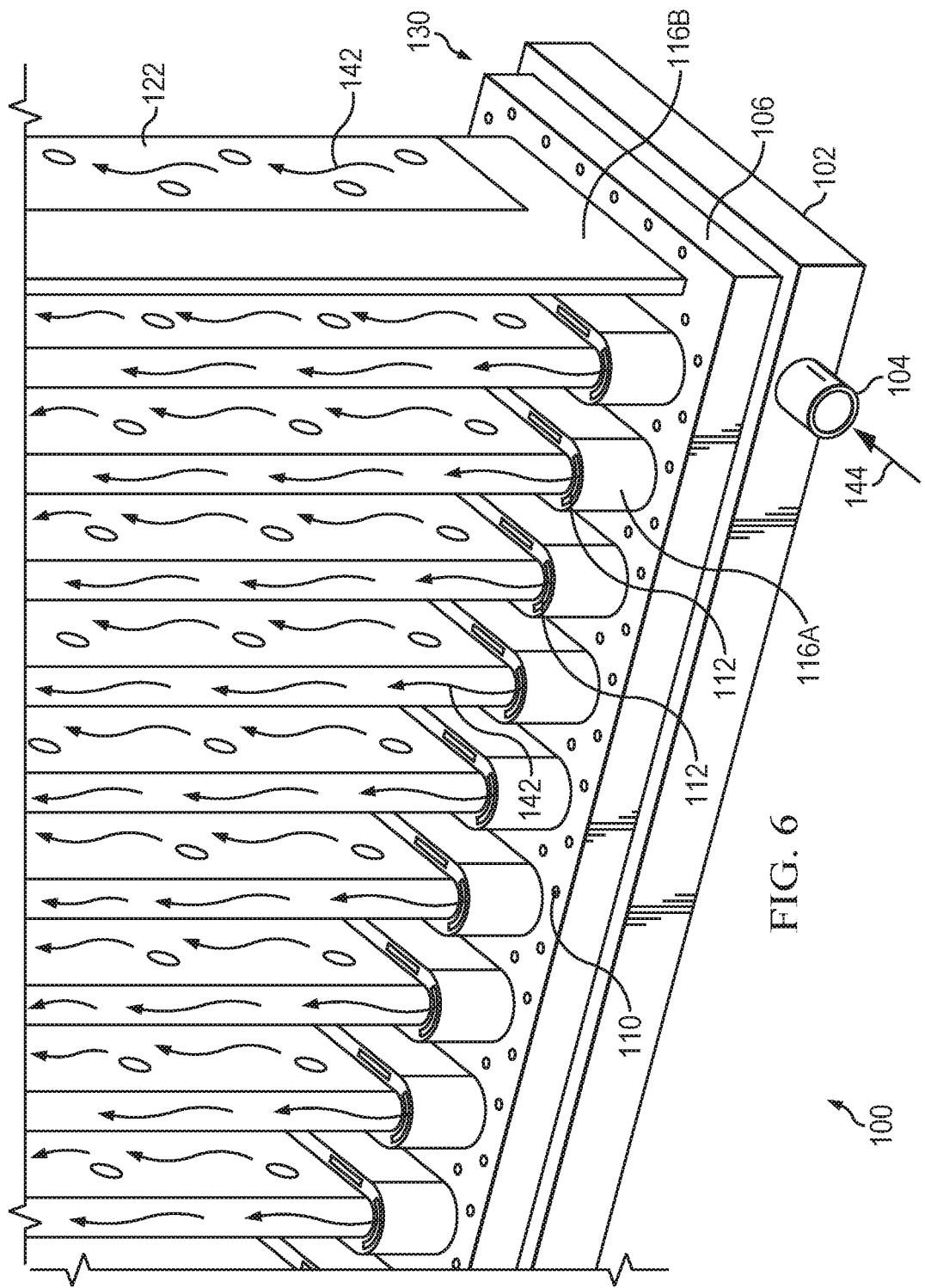
FIG. 6 is a schematic showing fluid flow patterns of FIG. 2.

FIG. 6 shows the section of the submersible membrane module (100) seen in FIG. 2 with the membrane sheets removed to demonstrate fluid movement in the interior of the module in its treatment method. The base (130) of the module has the draw fluid inlet manifold (102) attached (e.g., welded) to the frame (116A) with adjacent frame inlet openings (112) allowing fluid to move from the draw fluid manifold (102) into the bottom frame member (116A). The gas inlet manifold (106) with gas outlets (110) is positioned in the base (130) between the draw fluid manifold (102) and the bottom of the bottom frame member (116A), and is isolated from the draw fluid and permeate inside of the membrane lumen space. In use, draw fluid is directed (144) into the submersible membrane module (100) through the draw fluid inlet port (104) of the draw fluid manifold (102) at the base of the module via a conduit, such as a tube or pipe (not shown). The draw fluid (or coolant for membrane distillation) enters the lumen space between the two membranes via the frame inlet openings (112) in the bottom frame member (116A) and exits the submersible membrane module through similar frame outlet openings in the top frame member into the fluid outlet manifold (not shown) at the top of the submersible membrane module. The fluid flow path (142) is directed from bottom to top of the submersible membrane module by vacuum (suction) applied at the fluid outlet port at the top of the module.

The fluid, comprising permeate and draw fluid (or coolant), moves in a turbulent flow path (142) caused by the perforated spacer plate (122) and the frame inlets (112) on the bottom frame member (116A). The turbulence improves mixing of the interior fluid, offering better performance. The membrane (114, seen in FIG. 2) is not shown in this figure, but in use, the membranes would be sealed to the frame (116A, 116B, seen here) and the fluid would flow in the indicated direction (142) through the membrane lumen space.

The draw fluid inlet manifold (102) is used in submersible membrane modules for forward osmosis and membrane distillation (with coolant), but may not be required for all treatment applications. In modules without a draw fluid inlet manifold, the module base is the gas inlet manifold (106) secured to the bottom frame member (116A). In embodiments without a draw fluid manifold, the gas in the gas inlet manifold (106) is still isolated from the membrane lumen space (128B) and the bottom frame member (116A) does not have frame inlet openings, and gas bubbles discharged from the plurality of gas outlets (110) scour the membrane surfaces outside of the lumen space (128B).

Figure 7:
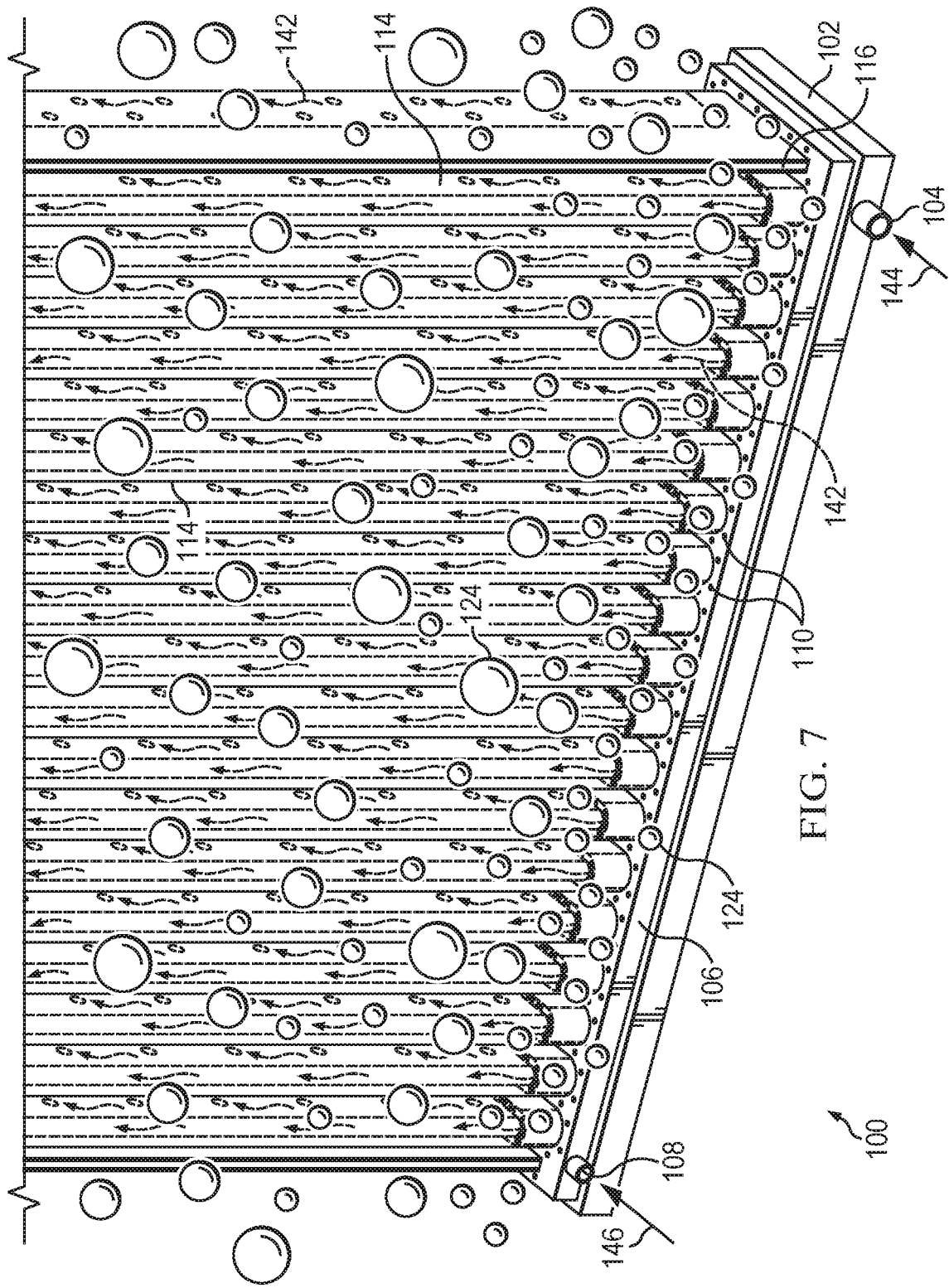
FIG. 7 is a stylized schematic of flow patterns and gas scouring in the corrugated submersible membrane module.

FIG. 7 is view of the bottom portion of the submersible membrane module (100) demonstrating the movement of scouring bubbles and the interior fluid. In use, the draw fluid is directed (144) via the draw fluid inlet port (104) to the draw fluid inlet manifold (102) into the membrane lumen space (128B) between the membrane sheets (114) and the frame (116) traveling in an upward direction (142) toward the top of the submersible membrane module. Fluid movement inside the membrane lumen space (128B) is assisted by suction applied to the fluid outlet port (120) in the fluid outlet manifold (118). A gas, such as air, is directed (146) via the gas inlet port (108) into the gas inlet manifold (106) and is discharged from a plurality of gas outlets (110) as bubbles (124). The plurality of gas outlets (110) distributed across the surface of the gas inlet manifold (106) follow the corrugated shape of the membranes (114) and the bubbles provide a scouring action to remove debris from the exterior of the membrane surfaces.

In FIG. 7, pluralities of gas bubbles (124) are shown as they leave the gas inlet manifold (106) from the gas outlets (110). Bubbles rise upward through the surrounding fluid to reach to the surface of the membranes and the rising bubbles provide a scouring action to clear debris from the exterior of the membranes (114). As used in these processing steps, the disclosed self-cleaning techniques, such as scouring using air or another gas, extend the life of the membranes and increase the overall efficiency of the submersible membrane module. Scouring with air bubbles is described herein; however other gases or self-cleaning techniques can be utilized in this submersible membrane module. The gas can be air or other suitable noble or stable gases, such as nitrogen, oxygen, saturated carbon-dioxide, unsaturated carbon-dioxide, and various other types of stable gases.

Alternatively, the submersible membrane module can be used in wastewater treatment applications where submersed membrane bioreactors or other membrane separation processes are used to treat a single fluid, with or without using vacuum on the other side of the module. Nanofiltration membranes, reverse osmosis membranes, microfiltration membranes, ultrafiltration membranes and combinations of membranes can be utilized for MBR applications. A single outlet port (120) located in the fluid outlet manifold (118) at the top of the module is used to withdraw clean water permeated through the membrane from the wastewater in which the module is submersed. In this application, no draw fluid or coolant is required, and the draw fluid inlet manifold is not part of the embodiment.

Figures 11, 12:
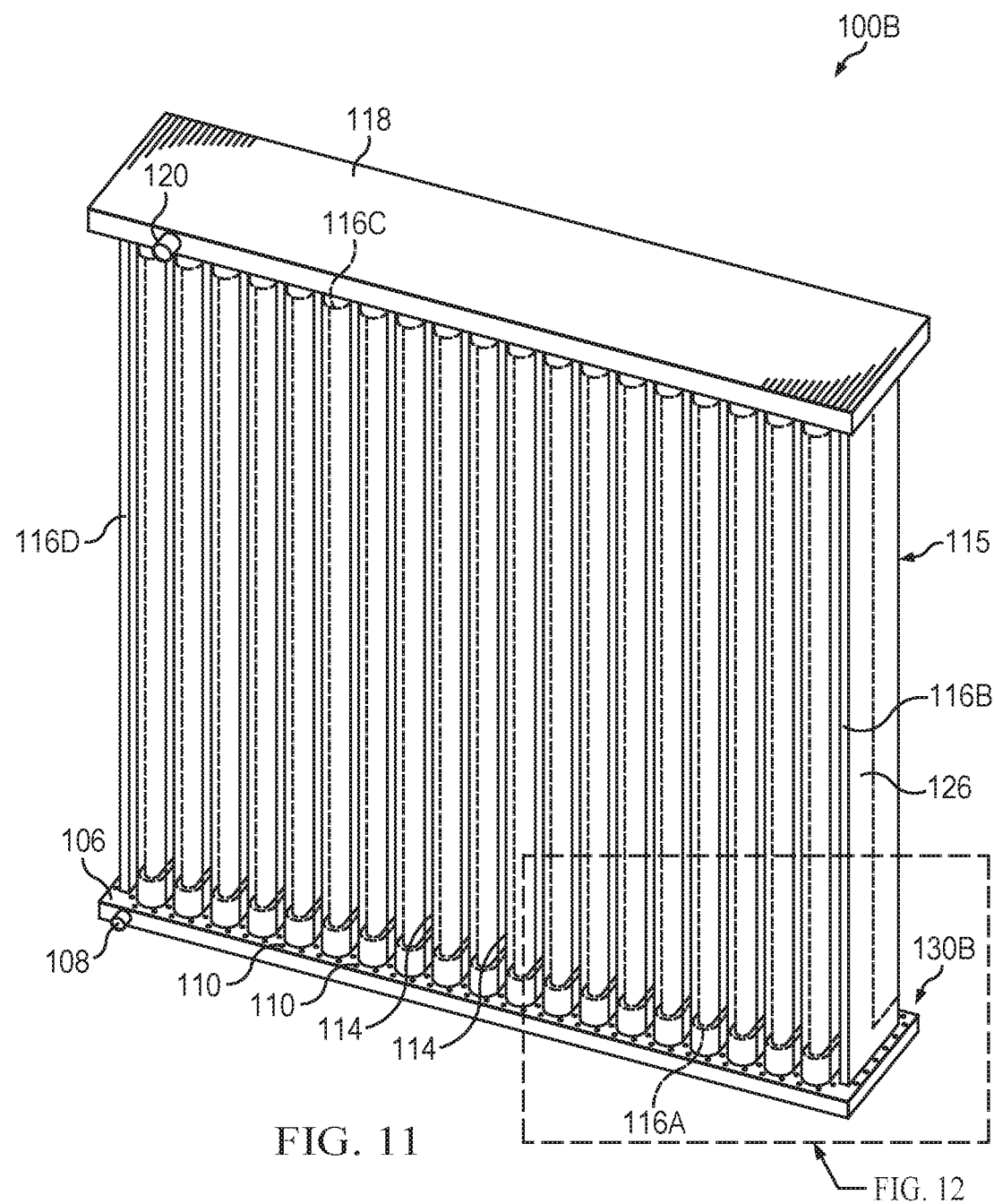
FIG. 11 is a front perspective view of an alternate embodiment of the corrugated submersible membrane module.
FIG. 12 is an enlarged view of the FIG. 11 base.
Figure 12:
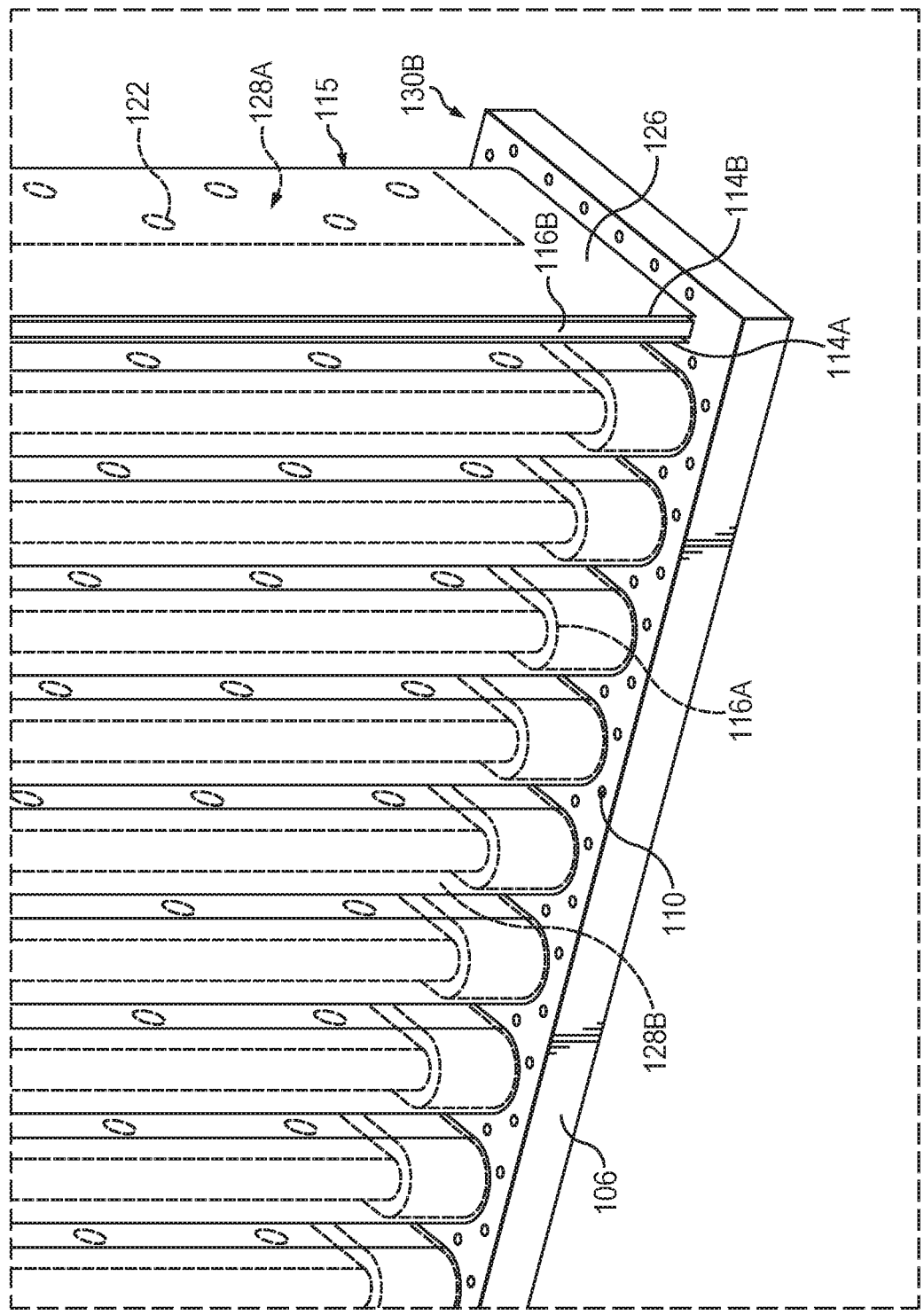

FIG. 11 shows the embodiment without the draw fluid inlet manifold. Reference numerals in FIG. 11 refer to the same elements seen in FIG. 1. The two embodiments differ in whether a draw fluid manifold is present. In the FIG. 11, the submersible membrane module (100B) has a corrugated membrane (114) attached to a corrugated membrane plate frame (116) encompassing the bottom, sides and top (116A-116D) of the open frame. In this view, the edges of the vertical portion of the side frame members (116B, 116D) are visible, and the horizontal frame members (116A and 116C, seen here beneath membrane 114) would be covered by membrane sheets (114) on the front and back sides of the frame. The corrugated membranes (114) have edges (126) attached along the surfaces of the frame (116) forming a corrugated membrane plate and frame core (115) having all edges of the membranes (114) sealed to the frame (116) to prevent leakage of the surrounding fluid into the membrane lumen space of the membrane plate and frame core (115).

The membrane plate and frame core (115) can also have a perforated spacer plate (122) situated in the membrane lumen space (128B) between the two membrane sheets (114A, 114B) providing separation between the active areas of the two sheets of membrane and enhancing turbulence of fluid traveling in the membrane lumen space (128B) of the submersible membrane module (100B). The spacer is in contact with the effective area (128A) of the membrane in the membrane plate and frame core (115), but is not attached to the membrane but is attached to the frame. In other embodiments, the perforated spacer plate (122) is not attached to the membrane or to the frame. The spacer plate (122) may take the form of a non-woven mesh-type spacer.

The membrane plate and frame core (115) is affixed to a base (130B) having the gas inlet manifold (106) attached (e.g., welded) to the bottom of the frame (116A), and the corrugated membrane plate and frame core (115) is capped by a fluid outlet manifold (118). In use, negative pressure (or suction) applied at the fluid outlet port (120) facilitates movement of the permeated fluid toward the fluid outlet manifold where it exits the submersible membrane module through the fluid outlet port (120) via a conduit, such as a tube or pipe (not shown).

The gas inlet manifold (106) has a gas inlet port (108) for the input of a gas, such as air, via a conduit, such as a tube or pipe (not shown). A plurality of gas outlets (110) in the gas inlet manifold (106) discharge scouring gas bubbles over the exterior surface of the membrane (114). Gas in the gas inlet manifold (106) is isolated from the permeated water in the membrane lumen space.

FIG. 12 is an enlarged view of the bottom right corner of the submersible membrane module (100B) in FIG. 11. As seen in FIG. 12, the membrane plate and frame core (115) includes a corrugated frame (116) having membrane sheets (114A, 114B) attached to each side of the frame, as seen with the vertical edge of the side frame member (116B) positioned between the two membrane sheets (114A, 114B). The membrane sheets (114A, 114B) are corrugated to fit along the corrugated frame members (116A seen here) and the membranes have edges (126) sealed around all of the frame (116) to prevent surrounding submersing fluid from entering the area inside the core without passing through one of the first and second corrugated membrane sheets (114A, 114B). The effective membrane area (128A) is the area of the membrane that is not sealed to the frame (116) and is the active area for osmosis from the surrounding fluid. Water from the surrounding fluid (permeate) passes through the active area (128A) of the membranes into the membrane lumen space (128B) between the active areas of the two membranes (114A, 114B).

The base (130B) of the unit includes the perforated gas inlet manifold (106), which is situated below the bottom frame member (116A). In this embodiment, the bottom frame member (116A) does not have frame inlet openings. The gas inside the gas inlet manifold (106) is separated from the lumen space (128B) between the membrane sheets and do not come in contact with the permeated fluids. As used, the perforated gas inlet manifold (106) has gas outlets (110) distributed over the gas inlet manifold surface for discharging gas bubbles for scouring of the exterior of the membrane surfaces (114A, 114B) by air or other gases, or providing for other self-cleaning or turbulence promoting techniques. The gas bubbles are discharged from the plurality of outlets (110) that follow the corrugations alongside the outer surface of each membrane sheet (114A, 114B) of the membrane plate and frame core (115). The gas can be air or other suitable noble or stable gases, such as nitrogen, oxygen, saturated carbon-dioxide, unsaturated carbon-dioxide, and various other types of stable gases.

Figure 13A:
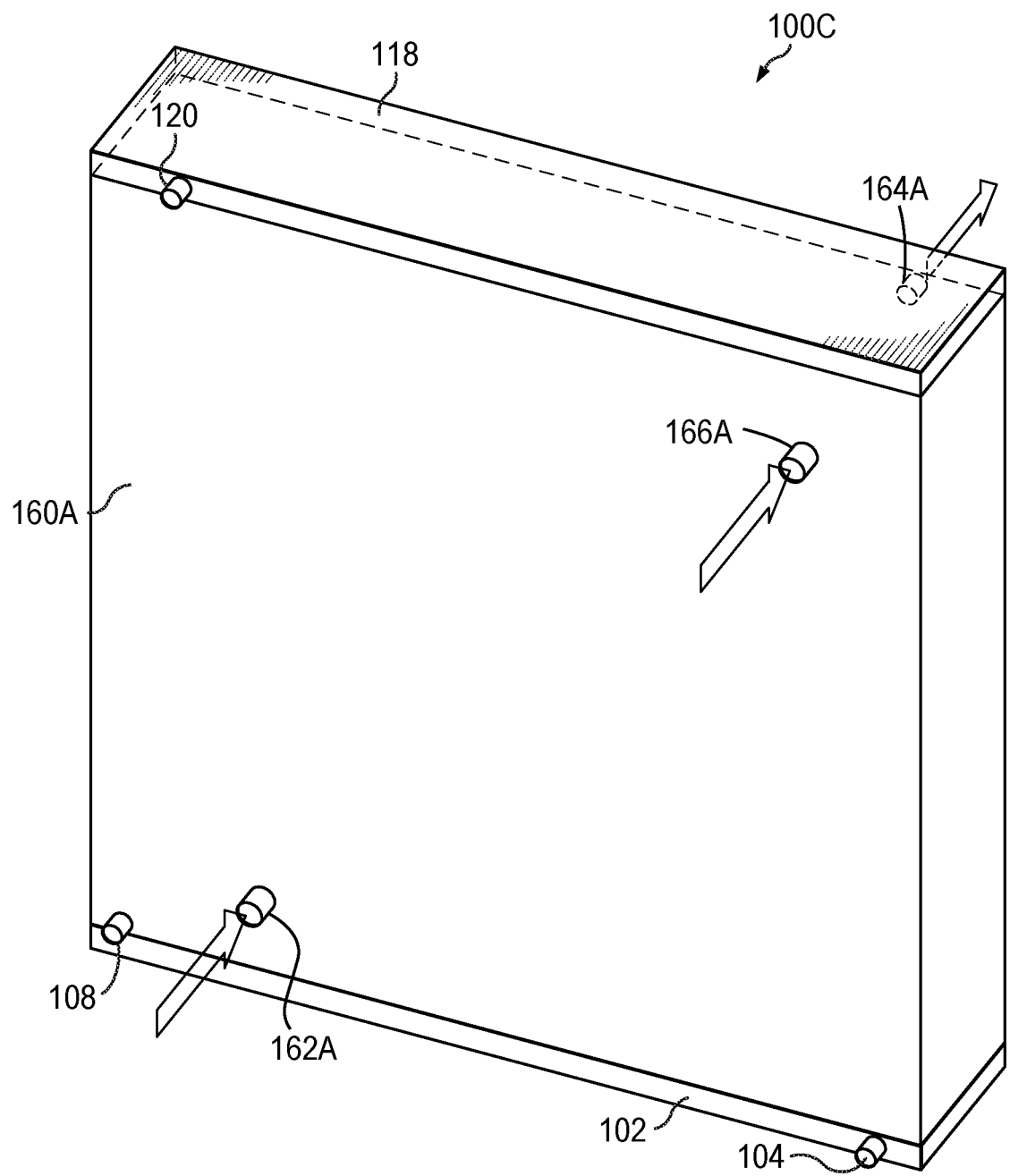
FIG. 13A is a front perspective view of a corrugated non-submersible membrane module according to an embodiment.
Figure 13B:
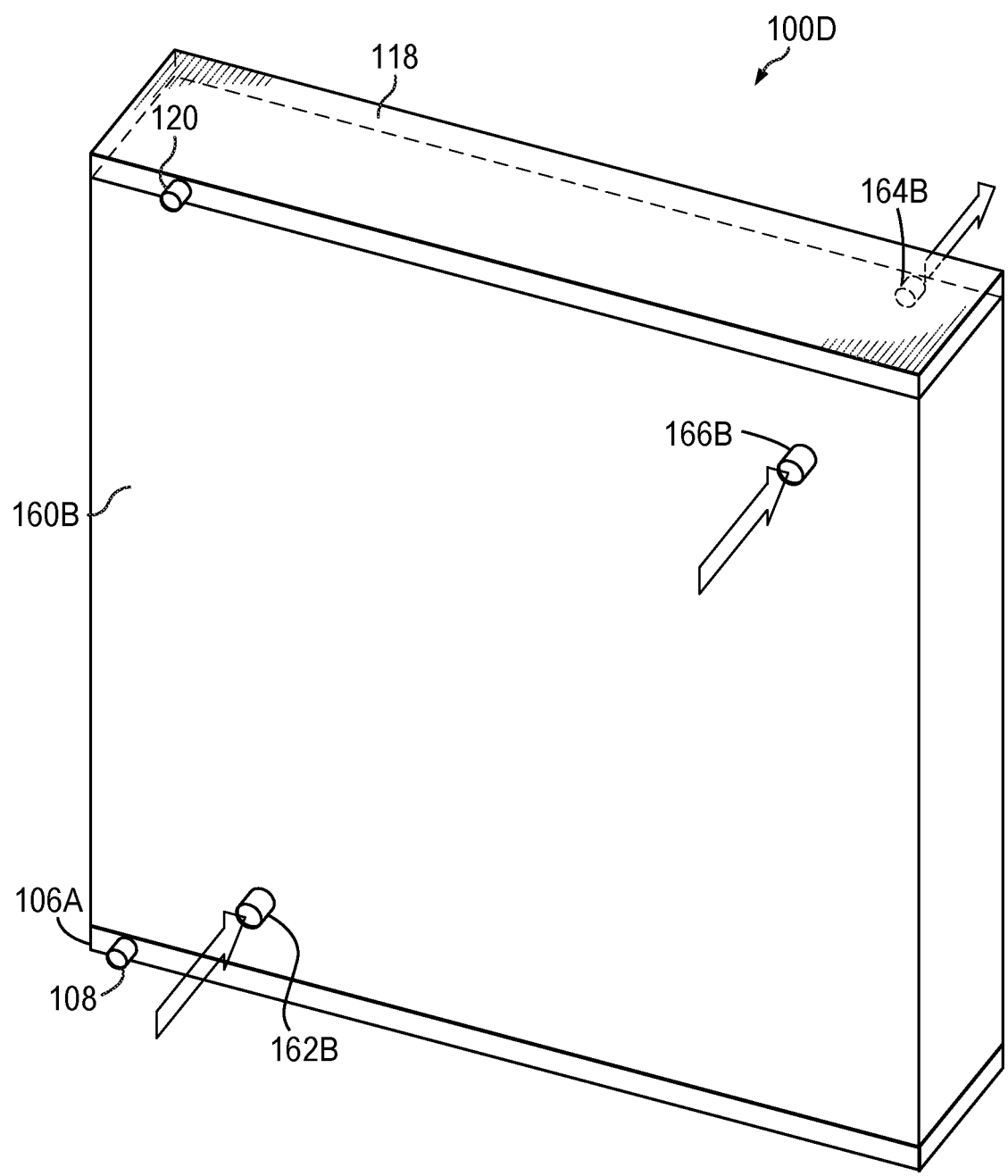
FIG. 13B is a front perspective view of a corrugated non-submersible membrane module according to another embodiment.

FIGS. 13A and 13B are a front perspective view of a corrugated non-submersible membrane module according to embodiments. In contrast to the submersible modules described above, in which the modules are submersed in a tank of the fluid to be treated, the non-submersible module illustrated in FIGS. 13A and 13B includes a housing having an inlet port to receive the fluid to be treated. Specifically, referring initially to FIG. 13A, the module (100C) includes a housing (160A) surrounding the membrane module (100) having the corrugated membrane (114). The membrane module (100) inside of the housing (160A) is constructed and operated in a similar manner to that described above in connection with FIGS. 1-10. The housing (160A) is attached, e.g., welded, to the draw fluid inlet manifold (102) and the fluid outlet manifold (118) from all four sides to create an airtight interior space for the feed fluid, i.e., the fluid to be treated. The feed fluid is supplied to the housing (160A) via a feed fluid inlet port (162A). Some of the feed fluid passes through the corrugated membrane (114) into the lumen space (128B) and is then passed out of the fluid outlet manifold (118) via fluid outlet port (120) as treated fluid. The remaining feed fluid passes out of the housing (160A) via feed fluid outlet port (164A). Because the housing (160A) forms an airtight space around the membrane module (100), a gas outlet port (166A) is provided, which allows the release of the gas emitted from the gas inlet manifold (106). As illustrated, the gas inlet port (108) passes through the housing (160A) so that gas can be supplied to the gas inlet port (108). Otherwise, the module (100C) illustrated in FIG. 13A is configured and operates in a similar manner to that described above in connection with the module (100) illustrated in FIGS. 1-10.

Turning now to FIG. 13B, the module (100D) includes a housing (160B) surrounding the membrane module (100B) having the corrugated membrane (114). The membrane module (100B) inside of the housing (160) is constructed and operated in a similar manner to that described above in connection with FIGS. 11 and 12, i.e., it is similar to that one described in connection with FIGS. 1-10 but does not include the draw fluid inlet manifold (102). The housing (160B) is attached, e.g., welded, to the gas inlet manifold (106A) and the fluid outlet manifold (118) from all four sides to create an airtight interior space for the feed fluid, i.e., the fluid to be treated. In the illustrated embodiment, the gas inlet manifold (106A) has dimensions corresponding to those of the fluid outlet manifold (118) so that the housing (160B) sits on top of the gas inlet manifold (106A) similar to the arrangement of housing (160A) sitting on top of the draw fluid inlet manifold (102). The additional top surface area of gas inlet manifold (106A) in FIG. 13A compared to gas inlet manifold (106) in FIG. 11, does not include the plurality of gas outlets (110) because this additional top surface area of the gas inlet manifold (106A) is covered by a bottom surface of the housing (160B).

The feed fluid is supplied to the housing (160B) via a feed fluid inlet port (162B). Some of the feed fluid passes through the corrugated membrane (114) into the lumen space (128B) and is then passed out of the fluid outlet manifold (118) via fluid outlet port (120) as treated fluid. The remaining feed fluid passes out of the housing (160B) via feed fluid outlet port (164B). Because the housing (160B) forms an airtight space around the membrane module (100), a gas outlet port (166B) is provided, which allows the release of the gas emitted from the gas inlet manifold (106A). As illustrated, the gas inlet port (108) does not pass through the housing (160B) because in the illustrated embodiment, the gas inlet port (108) is located below the housing (160B). Otherwise, the module (100D) illustrated in FIG. 13B is configured and operates in a similar manner to that described above in connection with the module (100B) illustrated in FIG. 1-11.

The module (100D) illustrated in FIG. 13B can be operated as a so-called "dead-end" configuration, in which case feed fluid outlet port (164B) is closed or sealed during treatment operation but can be used for maintenance purposes, such as to drain the fluid inside of the housing (160B).

Although FIGS. 13A and 13B illustrate the feed fluid inlet port (162) and outlet port (164) as being located in particular locations on the housing (160A, 160B), these ports can be arranged in different locations so long as they are arranged on opposite sides of the housing (160) so that the feed fluid is fed towards the corrugated membrane (114).

The particular manner of attaching the housing (160A, 160B) in FIGS. 13A and 13B is but one example and other manners can be employed. For example, the housing (160A, 160B) can run along the outer edges of the top and bottom manifolds, in which case the housing (160A, 160B) has openings for the various inlet or outlet ports that would otherwise be blocked by the housing (160A, 160B) in this configuration.

The modules (100C, 100D) illustrated in FIGS. 13A and 13B can be employed as stand-alone modules. In this case, the feed fluid outlet port (164A or 164B) can be coupled to the feed fluid inlet port (162A or 162B) to recirculate the untreated feed fluid for further processing. Alternatively, or additionally, modules (100C, 100D) illustrated in FIGS. 13A and 13B can be employed with other such modules in a variety of different configurations. One example configuration is a parallel-series-parallel configuration in which the feedwater is supplied in parallel to a first set of modules, the feedwater passing out of the feed fluid output ports (164A or 164B) of the first set of modules is combined and then supplied in parallel to a second set of modules for treatment. The modules of FIGS. 1 and 11 can be similarly arranged as either stand-alone modules or arranged in a parallel-series-parallel configuration.

Although FIGS. 13A and 13B illustrate the fluid outlet manifold (118) being arranged parallel to the ground and the draw fluid manifold (102) and in FIG. 13A and to the gas inlet manifold (106) in FIG. 13B, the fluid outlet manifold (118) can be arranged in a non-parallel configuration to encourage gas to escape from gas outlet port (166A or 166B) and avoid gas from being trapped in the housing (160A or 160B) against a bottom surface of the fluid outlet manifold (118). For example, the fluid outlet manifold (118) can be titled, in one or more directions, upward in the portion that is closest to the gas outlet port (166A or 166B), which in the illustrated embodiments is the front, right side of the fluid outlet manifold (118). In some embodiments, the gas outlet port (166A or 166B) can be arranged so that it passes through the fluid outlet manifold (118), while the two being fluidically isolated from each other, instead of being arranged on a front face of the housing (160A or 160B) in FIGS. 13A and 13B.

The non-submersible membrane modules of FIGS. 13A and 13B can include a drainage port (not illustrated), which is a sealed port for draining feedwater from the module during maintenance. The drainage port can be located on the sidewalls of the housing of the mobiles, preferably near the bottom to housing. Alternatively, the drainage port can be arranged on a bottom of the base of the module.

The disclosed membrane modules can be used for numerous applications including, but not limited to, forward osmosis or membrane distillation applications for seawater desalination, dilution of saline water, dilution of brackish water, pretreatment applications, water recovery from impaired quality water sources such as domestic and/or industrial wastewater, produced water treatment, reduction of wastewater volumes, zero liquid discharge applications, salt production, food and beverage concentration, and pharmaceutical applications, among others. The membrane module has two embodiments that may be used depending on the type of application—one having a draw fluid inlet manifold and one without a draw fluid manifold. In either embodiment, the membrane sheets can be attached to the central corrugated plate and frame using chemical resistant adhesives, such as epoxy. The membrane modules of either of these two embodiments can be arranged in a housing as a non-submersible module instead of a submersible module.

Methods for Manufacturing and Processing Uses of the Membranes:

The disclosed membrane module, except for the membranes themselves, can be made of a low-cost corrosion-resistant light-weight material, preferably PVC. The module can be manufactured using 3D printing, injection molding, thermal forming and pressing, or combinations of these techniques to produce the individual components or combined components, such as a frame core. For either embodiment, the membrane sheets can be attached on the central corrugated plate and frame using strong chemically resistant adhesives, such as epoxy. Any type of membrane sheet that can be conformed to the corrugated shape and attached to the frame may be employed in the disclosed module; however, the type of membrane sheets utilized will vary depending on the specific type of treatment application. For example, a forward osmosis process would require a different membrane than one used for membrane distillation.

The membrane modules illustrated in FIGS. 1, 2, and 13A, with the draw fluid inlet manifold, can be used in applications where two different fluid streams should be separated by membrane sheets, such as forward osmosis or membrane distillation. This module has an inlet and outlet for a single fluid that moves inside the two sheets of membrane in total isolation from the outside fluid to which the module is exposed. The clean draw fluid (in forward osmosis) or coolant (in membrane distillation) runs through the lumen space created by the two sheets of membrane attached to the corrugated membrane plate and frame while the module is exposed to the lower-salinity feed fluid (wastewater). The draw fluid or coolant induces the permeation of water through the membranes. Negative pressure, via vacuum or suction, can be used to facilitate movement of the draw fluid or coolant into the module and for removal of permeated materials from the fluid outlet manifold.

Alternatively, the membrane modules illustrated in FIGS. 11, 12, and 13B, without a draw fluid manifold, can be used in wastewater treatment applications where membrane bioreactors or other membrane separation processes are used to treat a single fluid, with or without using vacuum on the permeate collection side of the module. Nanofiltration membranes, reverse osmosis membranes, microfiltration membranes, ultrafiltration membranes and combinations of membranes can be utilized for MBR applications. A single outlet port located in the fluid outlet manifold at the top of the module is used to withdraw clean water permeated through the membrane from the wastewater to which the module is exposed.

An exemplary manufacturing process is described herein. First, the module frame, draw fluid inlet manifold, gas inlet manifold, fluid outlet manifold and perforated spacer can be made using injection molding or using 3D printing. The components can be manufactured as a single unit or as variously configured subunits that are attached (e.g., welded together) into the module frame core. Next, while the corrugated module frame core is held in a vertical position, two sheets of membrane having the same height as the corrugated core can be extended along the module. Extra length provided on each of the membranes will facilitate placement on the module frame. Then, a device having vertical rods spaced to correspond to the corrugated core, with rod diameters slightly smaller than each corrugated turn's width and rod heights slightly less than the corrugated core, pushes the two membrane sheets into their respective locations on the module core.

Once the membrane sheets have been pressed into the corrugated shape, a vacuum can be applied to the fluid outlet port on the fluid outlet manifold at the top of the module. Blocking the draw fluid inlet port at the bottom would be required for embodiments having the draw fluid inlet manifold. The resulting vacuum will hold the sheets of membrane in place, and an adhesive, such as epoxy glue, can be applied to the membrane edges to seal the membrane sheets securely to the frame of the module core. If the perforated spacer plate is to be included, the spacer is set in place prior to installing the membrane sheets. The spacer should be fixed to the membrane frame to ensure it stays in place during operation. Fluid moving inside the lumen space may affect the position of the spacer if it were unaffixed.

Invention Calculations and Equations:

A comparison is made between the disclosed submersible corrugated active membrane area and the active membrane of a conventional flatsheet plate and frame design. The comparison is made against a commercially available submerged forward osmosis (FO) module where the total area provided is 1.26 squared meters of active membrane area per module. The disclosed submersible corrugated membrane module design offers around 4.4 squared meters of active membrane area per module for the same size (height, length and depth) as the commercial module, taking into consideration the deactivated membrane area due to adhesion of the membrane to the central plate and frame assembly. The increase in production capacity is equivalent to ~250% compared to the commercially available module. Also compared is an intermediate design with flatsheet membranes like the conventional design running the along the shorter dimensions of the modules, with a number of sheets equal to the number of turns on the corrugated design, and having have the same dimensions and footprint as the conventional design. Calculations and comparison data are shown in Examples 1-4 and Tables 1-4.

Another performance comparison is made against commercially available Membrane Bioreactor (MBR) wastewater treatment modules offering a total active membrane area of 70 meters squared. The proposed design increases the active membrane area by 219%, reaching an active membrane area of 223 squared meters. The comparison is shown in Example 5, and Tables 5 and 6 provide the specifications of the commercial MBR module and the calculations for the disclosed corrugated design, respectively.

EXAMPLES

Example 1

Calculations for Disclosed Corrugated Design

The design of the disclosed corrugated membrane plate and frame design was optimized using mathematical formulas derived from the geometric shapes of the corrugated membrane shown in FIGS. 8A-8D.

Figure 8A:
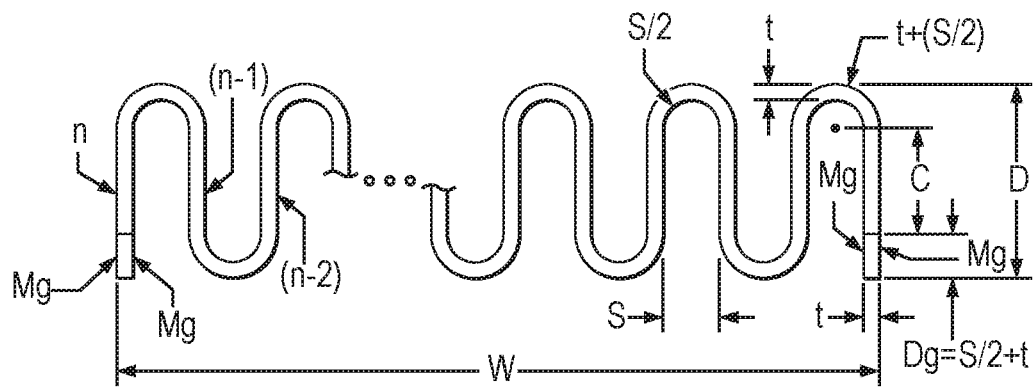
FIG. 8A is a schematic of the top of a corrugated membrane sheet.
Figure 8B:
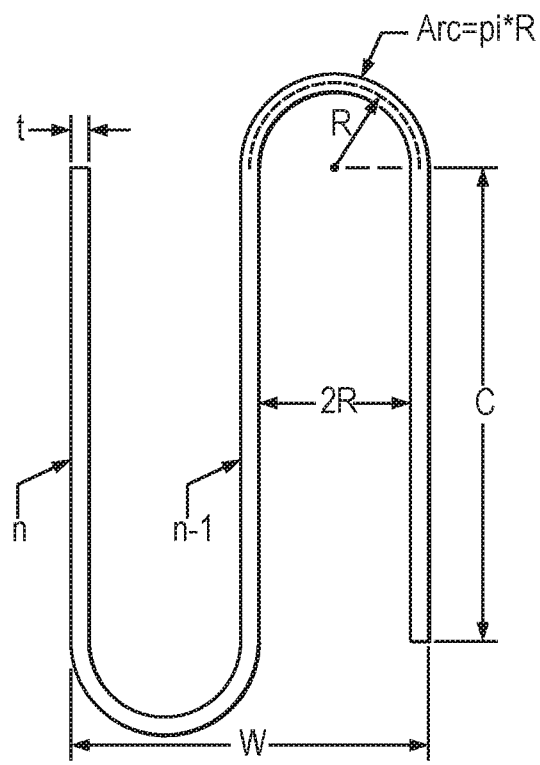
FIG. 8B is an enlargement of the top of a corrugated membrane sheet.
Figure 8D:
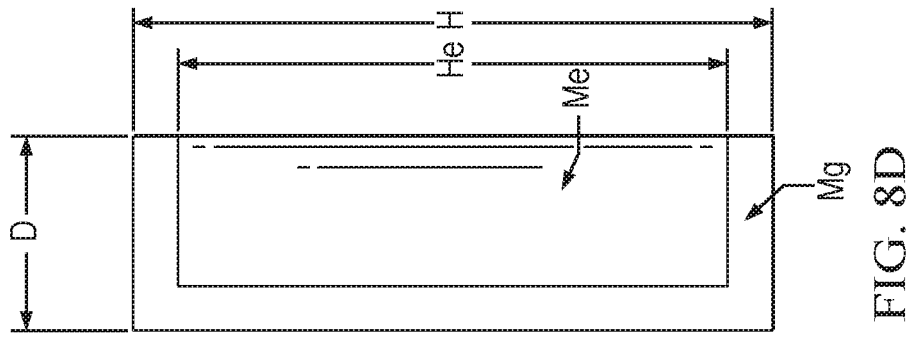
FIG. 8D is a schematic of the side of a corrugated membrane sheet assembly.
Figure 8C:
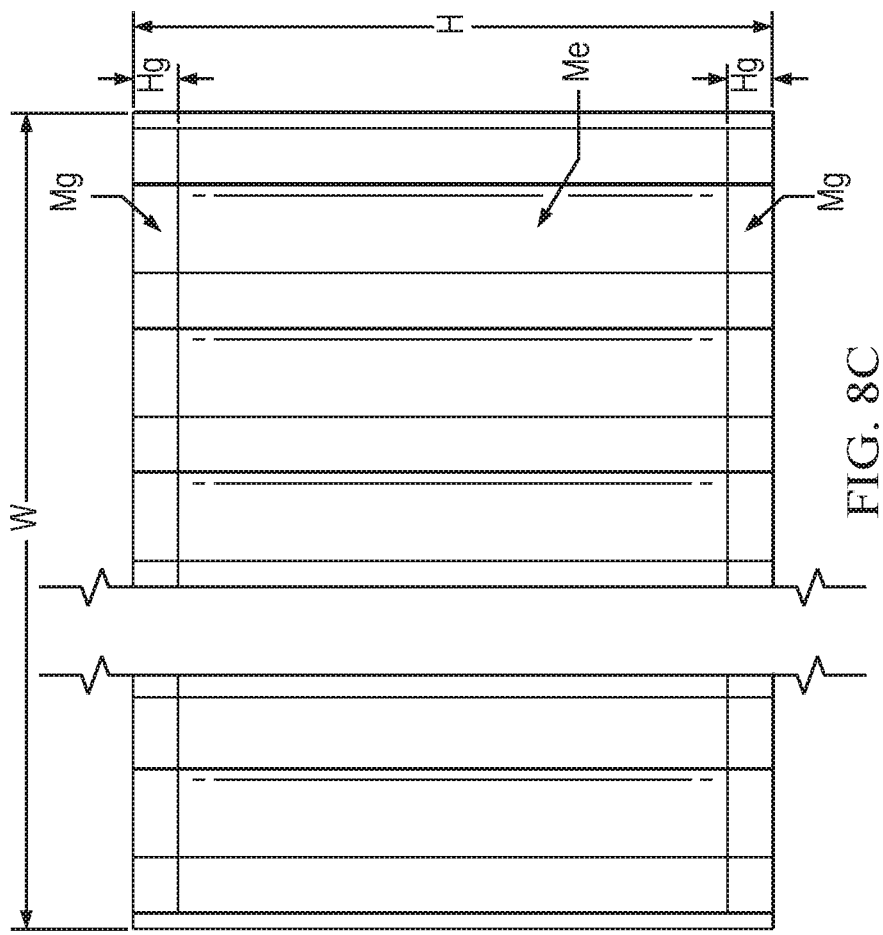
FIG. 8C is a schematic of the front of a corrugated membrane sheet assembly.

FIG. 8A shows a top view of a corrugated membrane sheet with a total number of turns equal to n. FIG. 8B is an enlargement of a corrugated turn on the central membrane plate. FIG. 8C is schematic of a front view of the membrane for the disclosed module. FIG. 8D schematic of a side view of the membrane for the disclosed module. With reference to FIGS. 8A-8D, the equations for calculating the total effective membrane area in the disclosed design are shown below, where:

$A_1$=Effective Membrane Area in the Corrugated Design
$L_e$=Effective length of the membrane sheets, excluding any attached lengths
n=Number of turns per membrane element
s=Spacing between turns
t=Thickness of membrane plate frame on which two sheets of membrane are attached
C=Straight line depth according to FIG. 8A
D=Membrane module total depth
$D_g$=Depth of attached area
H=Total height of membrane
$H_e$=Effective height of the membrane sheet, excluding attached areas
$H_g$=Height of attached area
$M_e$=Effective membrane area
$M_g$=Attached membrane area
W=Total membrane module width Derivation for the equation calculating the effective membrane area in the disclosed corrugated membrane design is seen below:

$$\text{Corrugated Design Effective Membrane Area } (A_1) = $$
$$\text{Effective Membrane Length} \times$$
$$\text{Effective Membrane Height} =$$
$$L_e \times H_e = [2nC + (n-1)(\text{Length of Outer Arc}) +$$
$$(n-1)(\text{Length of Inner Arc})] \times$$
$$H_e = [2nC + (n-1)(\text{Length of Outer Arc} +$$
$$\text{Length of Inner Arc})] \times$$
$$H_e = [2nC + (n-1)(\pi r_{outer} + \pi r_{inner})] \times$$
$$H_e = [2nC + \pi(n-1)(r_{outer} + r_{inner})] \times$$
$$H_e = \left[2nC + \pi(n-1)\left(\left(\frac{s}{2}+t\right)+\frac{s}{2}\right)\right] \times H_e$$
$$\to A_1 = H_e \times [2nC + \pi(n-1)(s+t)]$$

$\to$ Equation 1

To find the equation that determines the number of turns (n) that can be fitted inside a module of a total width of W:

Since $W = n(s+t) - s$,

Therefore, the total number of turns, or corrugations that can be fitted into one module of width W is equal to:

$$\to n = \frac{W+s}{s+t}$$

$\to$ Equation 2

To find the length of C of each turn:

$$\text{Since } D = \left(\frac{s}{2}+t\right)+\left(\frac{s}{2}+t\right)+C$$
$$= C + s + 2t$$
$$\to C = D - s - 2t$$

$\to$ Equation 3

With reference to FIG. 8B, an enlargement of a corrugated turn on the central membrane plate showing the two layers of membranes attached along the edges, where:
t=thickness of plate
R=radius of the half circle of the curve
2R=gap between each straight part of the membrane plate
Arc length=pi*R (or τR)
C=the length of the straight part of the of the membrane plate
W=total membrane module width
H=total membrane module height
$H_e$=effective membrane height
n=total number of turns per module The equation used for calculating the effective membrane area is:

Effective Membrane Area=$2H_e[nC+\tau R(n-1)-0.06]$

Whereas the equation for R is derived from the equation of total module width $W=nt+(2R-t)*(n-1)$; hence, $R=(w-t)/(2*(n-1))$ To optimize the design, the number of turns (n) was entered, and then a thickness for the membrane plate (t) was selected. Once these two criteria are selected, R can be determined, and the effective membrane area is determined using the equation above.

For reference, the derivation for the equation is shown below:

Effective Membrane Height × (Total Length of Inner Membrane +

Total Length of Outer Membrane) =

$H_e \times [n \times C +$ (inner arc length × $(n-1)) -$ attached membrane area] $+ H_e \times [n \times C +$ (outer arc length × $(n-1)) -$ attached membrane area] $=$ $H_e \times [nC + \pi(R - t/2)(n-1)) = 0.06] +$ $He \times [nC + \pi(R + t/2)(n-1)) -$ $0.06] =$ $H_e[2nC + 2\pi R(n-1) - 0.12] =$ $2H_e[nC + \pi R(n-1) - 0.06] \leftarrow$ Example 2

Calculations for Conventional Flat Plate Design

In order to compare the total effective membrane areas between the disclosed submersible module (corrugated design) and a conventional plate and frame design having the same dimensions and footprint; the overall height, width and depth of the modules in both designs are kept equal. The spacing and thickness of the membrane plates are also kept the same between the two designs when calculating effective membrane areas.

Figure 9B:
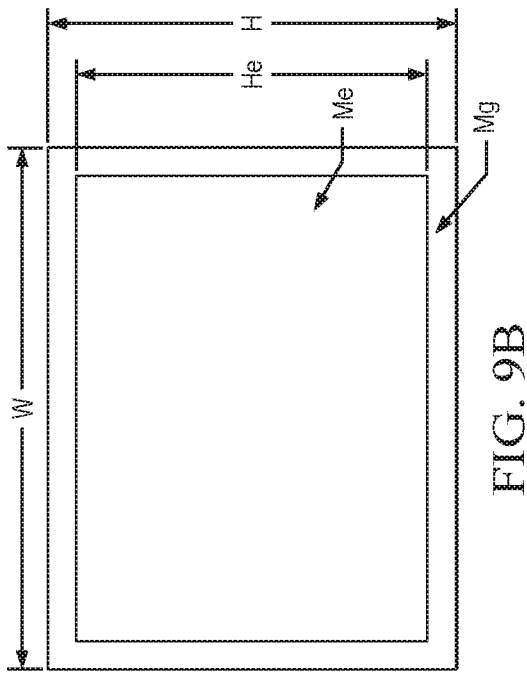
FIG. 9B is a schematic of the front of a conventional plate and frame assembly.
Figure 9C:
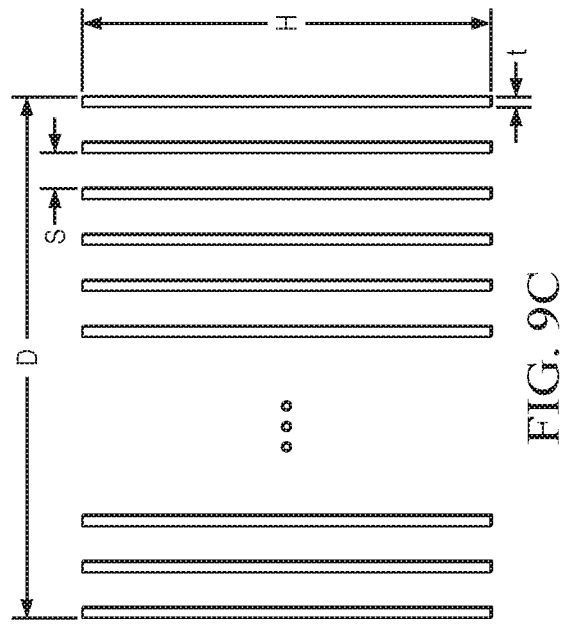
FIG. 9C is a schematic of the side view of a conventional plate and frame assembly.
Figure 9A:
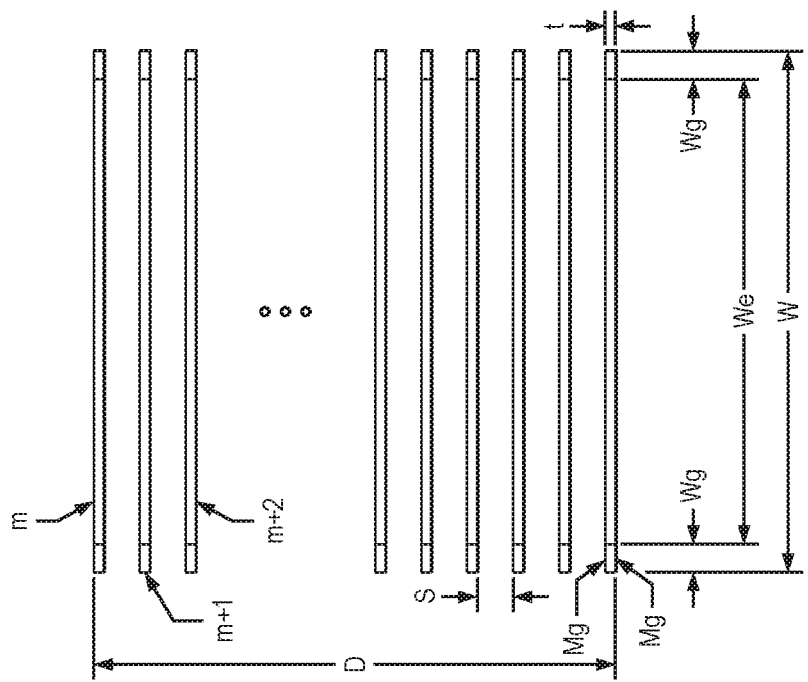
FIG. 9A is a schematic of the top of a conventional plate and frame assembly.

FIG. 9A shows a schematic for the top view of a conventional design with flatsheet membranes with a total number of membranes equal to m. FIG. 9B is schematic of a front view of a membrane sheet for a conventional module. FIG. 9C is a schematic of a side view of membranes for a conventional module. With reference to FIG. 9A-9C, the equations for calculating the total effective membrane area in a conventional design are shown below, where:

$A_2$=Total effective membrane area per module in the conventional design
m=Total number of membrane elements packed in one module
s=Spacing between membranes
t=Thickness of membrane plate frame on which two sheets of membrane are attached
D=Total depth of membrane
H=Total height of membrane
$H_e$=Effective height of the membrane sheet, excluding attached areas
$M_e$=Effective membrane area
$M_g$=Attached membrane area
W=Total membrane width
$W_e$=Effective width of a single element within a module=total element width−attached areas
$W_g$=Width of attached membrane Derivation of the equation that calculates the effective membrane area ($A_2$) in a commercially available conventional membrane design is shown below:

Effective Membrane Area ($A_2$)=Total number of elements×Effective Membrane Width×Effective Membrane Height→$A_2=2\times m\times H_e\times W_e$ →Equation 4

Example 3

Calculations for Intermediate Design

For comparison, effective membrane area of an intermediate design was calculated. In the intermediate design, flat membrane plates would run along the shorter dimension of the module, instead of the longer side as in the conventional design, and would have the same dimensions and footprint; with the same overall height, width and depth used in the calculations for the disclosed submersible design and the conventional design, in order to provide a direct comparison of the membrane area. The intermediate design considered would have the same number of sheets as the number of turns on the corrugated design, but would have attached edges on all sides of the membrane sheets and no corrugations.

Figure 10C:
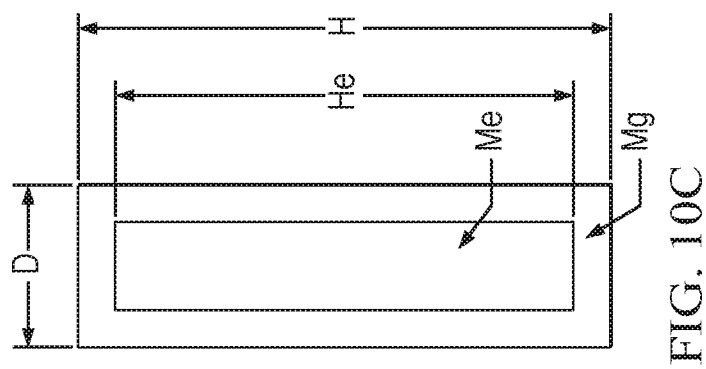
FIG. 10C is a schematic of the side of an intermediate arrangement for a plate and frame filtration assembly.
Figure 10A:
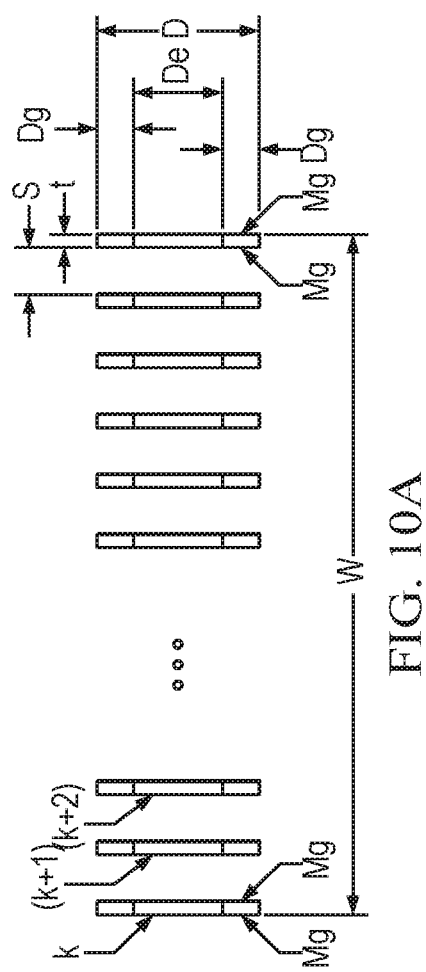
FIG. 10A is a schematic of the top of an intermediate arrangement for a plate and frame filtration assembly.
Figure 10B:
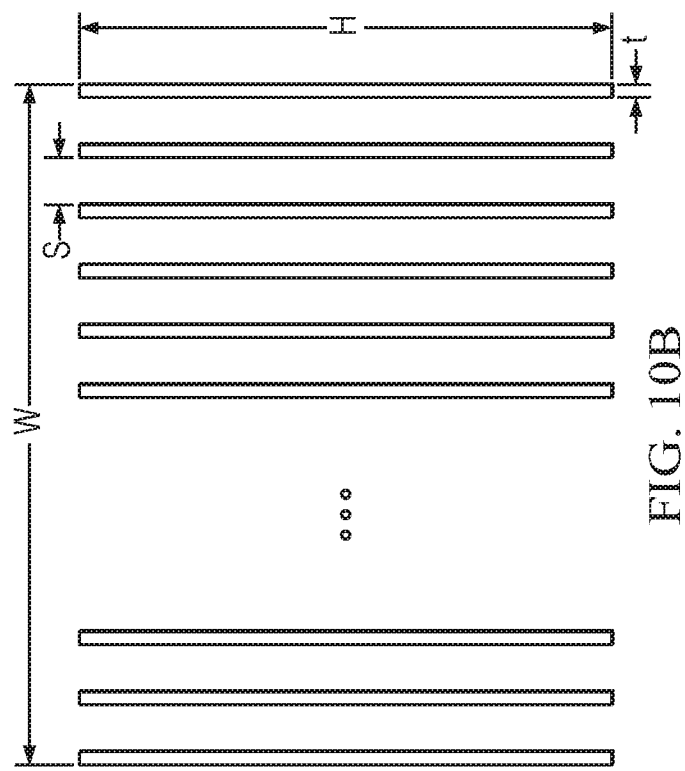
FIG. 10B is a schematic of the front of an intermediate arrangement for a plate and frame filtration assembly.

FIG. 10A shows a schematic for the top view of an intermediate design membrane sheet with a total number of membranes equal to m. FIG. 10B is schematic of a front view of membranes for an intermediate design. FIG. 10C is a schematic of a side view of a membrane for an intermediate design. With reference to FIG. 10A-10C, the equations for calculating the total effective membrane area of a membrane for an intermediate design are shown below, where:

$A_3$=Total effective membrane area per module in the intermediate design
k=Total number of membrane plates packed in one module
D=Total depth of the module
$D_e$=Effective depth of the module excluding attached areas=$D-D_g$
$D_g$=Attached depth of the membrane on the membrane plate (this value is taken as 2 cm on each side of the plate)
H=Total height of membrane
$H_e$=Effective height of the membrane sheet, excluding attached areas
$M_e$=Effective membrane area
$M_g$=Attached membrane area
W=Total membrane width Derivation for the equation that calculates the effective membrane area in an intermediate design where flat membrane plates run along the shorter dimension of the module is shown below:

Effective Membrane Area ($A_3$)=Total number of membrane elements×Effective Membrane Depth×Effective Membrane Height→$A3=2\times k\times H_e\times D_e$ →Equation 5

The equation to calculate the number of plates that can be packed inside one module of the FIG. 10 intermediate design is shown below:

$$W = k(s+t) - s, \text{ then:} \quad \rightarrow \text{Equation 6}$$
$$\rightarrow k = \frac{W+s}{s+t}$$

Example 4

Calculation of Percent Increase of Effective Membrane Areas

Calculations shown in the following tables demonstrate that a corrugated design provides 134% more effective membrane area per module as a commercially available submersible forward osmosis flat-sheet module of the same size, immediately doubling the capacity of the module. In the calculation for Tables 1 and 2 below, the plate thickness (t) and membrane spacing (s) of elements for the conventional design and the corrugated design are kept the consistent. In all calculations below, for all designs, the values for the following parameters are kept the same as the values used for the conventional flatsheet design in order to provide consistent data for comparison.

Depth (D)=8.5 cm
Width (W)=46 cm
H (Height)=44 cm
$H_e$=H−$H_g$ (Height attached)=44 cm−6 cm=38 cm (Effective Height)

In Table 1, below, calculations of effective membrane area for a submersible forward osmosis flat sheet module (seen in FIGS. 9A-9C) based on a commercially available design are shown. In the commercial module, there are 6 membrane sheets which are each sealed on all four edges. The effective membrane area is 1.26 $m^2$.

TABLE 1

| | Specifications of Commercially Available Forward Osmosis Flat Sheet Submersible Module | |
|---|---|---|
| 1 | Conventional Submersible FO Module | Measurement/Unit |
| m | Actual total number of elements per module | 6 Elements |
| t | Measured thickness of each element in the module | 0.3556 cm |

TABLE 1-continued

Specifications of Commercially Available Forward Osmosis
Flat Sheet Submersible Module

| 1 | Conventional Submersible FO Module | Measurement/Unit |
|---|---|---|
| s | Measured spacing between elements in the module | 0.5334 cm |
| D | Measured total module depth excluding inlet and outlet | 8.5 cm |
| W | Measured total module width | 46 cm |
| $W_g$ | Attached width in each element taken as 3 cm from each side | 6 cm |
| $W_e$ | Effective width in each element = W − Wg | 40 cm |
| H | Measured total height of each element | 44 cm |
| $H_g$ | Attached height in each element taken as 3 cm from each side | 6 cm |
| $H_e$ | Effective height in each element = H − Hg | 38 cm |
| $A_2$ | Effective membrane area given in the commercial product sheet | 1.26 m$^2$ |

Table 2, below, summarizes calculations for the claimed submersible corrugated design (seen in FIGS. 8A-8D) for a module having the same unit dimensions for length, height and width (footprint) as the commercial module from Table 1. As seen in Table 2, the submersible corrugated design has a much greater active area (2.34 m$^2$) than the commercial flat plate and frame design (1.26 m$^2$), yielding a 134% increase in effective membrane area for the same sized module.

TABLE 2

Calculations of the Claimed Corrugated Design

| 2 | Corrugated Design | Measurement/Unit |
|---|---|---|
| | Equation 1 --> $A_1 = H_e \times [2nC + \pi(n − 1)(s + t)]$ | |
| $H_e$ | Effective height in each element = H − Hg | 38 cm |
| n | Total number of turns per module<br>n = (We + s)/(s + t) | 45 turns |
| C | Straight line depth = D − s − 2t | 7.2554 cm |
| t | Thickness of each element in the module | 0.3556 cm |
| s | Spacing between elements in the module | 0.5334 cm |
| $A_1$ | $A_1 = H_e \times [2nC + \pi(n − 1)(s + t)]$ | 2.95 m$^2$ |
| | $A_1/A_2$, whereas $A_2$ is commercial membrane area per module (1.26 m$^2$) | 2.34 |
| % A | = 100 × [($A_1/A_2$) − 1] | 134% |

The production capacity of the disclosed submersible corrugated membrane plate and frame design is compared herein to an equivalently sized commercially available (FO) module in order to compare production efficiency on a uniform scale; however, the corrugated membrane plate and frame design can be sized up or down depending on the specific treatment application, and is not limited to a single unit size.

As shown in Table 3, below, an intermediate design has 32% less area than the commercial configuration. The intermediate design (seen in FIGS. 10A-10C) has flat plates sealed on all edges (like the commercial design) and has a number of plates equal to the number of turns in the disclosed corrugated design. The decrease in effective area is due to the membrane area lost from gluing edges for the membranes on each of the multiple plates.

TABLE 3

Calculations for Intermediate Design

| 3 | Intermediate Design | Measurement/Unit |
|---|---|---|
| | Equation 5 --> $A_3 = 2 \times k \times H_e \times D_e$ | |
| $H_e$ | Effective height in each element = H − $H_g$ | 38 cm |
| k | Total number of elements per module<br>k = (We + S)/(s + t) | 45 Plates |
| $D_e$ | Effective Depth = D − $D_g$, $D_g$ is taken as 6 cm | 2.5 cm |
| t | Thickness of each element in the module | 0.3556 cm |
| s | Spacing between elements in the module | 0.5334 cm |
| $A_3$ | $A_3 = 2 \times k \times H_e \times D_e$ | 0.86 m$^2$ |
| | $A_3/A_2$, whereas $A_2$ is commercial membrane area per module (1.26 m$^2$) | 0.68 |
| % A | = 100 × [($A_3/A_2$) − 1] | −32% |

The corrugated design provides a direct way to increase production capacity per module 3-fold, which is achieved by increasing the active membrane area packed into a single module. The corrugated design further increases the production from the examples in Table 2, by reducing the membrane plate thickness (t) and reducing the spacing between turns (s) from those in the conventional design, while keeping the module dimensions unchanged (W, D, H and He).

Table 4, below, shows that reducing "t" from 0.35 cm to 0.2 cm and "s" from 0.53 cm to 0.4 cm will increase the effective membrane area by more than 3 times (~250%) without affecting the footprint of the module, i.e. the size of the module remains unchanged, while the membrane packing density per module is tripled due to the resulting increase in the number of turns (n). Increasing the number of turns (n) in the corrugated design is similar to increasing the number of membrane elements in the conventional design. However, increasing the number of elements in the conventional design does not increase the packing density of the module without increasing the footprint of the module, even when using smaller values for the plate thickness (t) and the spacing between elements (s). Calculations in Table 4 show the effective membrane area of the corrugated membrane design when the thickness of the membrane element "t" and the spacing between turns "s" are reduced from the dimensions in Table 2, above.

TABLE 4

Calculations of Effective Membrane Area of Corrugated Design with Modified Thickness and Spacing

| 4 | Corrugated Design - Modified Thickness and Spacing | Measurement/Unit |
|---|---|---|
| | Equation 1 --> $A1 = H_e \times [2nC + \pi(n − 1)(s + t)]$ | |
| $H_e$ | Effective height in each element = H − $H_g$ | 38 cm |
| n | Total number of turns per module<br>n = (We + s)/(s + t) | 67 turns |
| C | Straight line depth = D − s − 2t | 7.7 cm |
| t | Thickness of each element in the module | 0.2 cm |
| s | Spacing between elements in the module | 0.4 cm |
| $A_4$ | $A_1 = H_e \times [2nC + \pi(n − 1)(s + t)]$ | 4.39 m$^2$ |
| | $A_4/A_2$, whereas $A_2$ is commercial membrane area per module (1.26 m$^2$) | 3.49 |
| % A | = 100 × [($A_4/A_2$) − 1] | 249% |

A further increase in the active membrane area can be achieved by adjusting the values of "t" and "s". For example, referring to the module in Table 4, reducing "s" from 0.4 cm to 0.2 cm increases the active membrane area to be 414% greater than a conventional module.

Example 5

Comparison of Commercial MBR and Disclosed Corrugated Design

Another performance comparison is made against commercially available Membrane Bioreactor (MBR) wastewater treatment modules offering a total active membrane area of 70 meters squared. The proposed design increases the active membrane area by 219%, reaching an active membrane area of 223 squared meters. Table 5 and Table 6 provide the specifications of the commercial MBR module and the calculations for the disclosed corrugated design, respectively.

The following tables show a comparison between the proposed design and a conventional flat sheet design applied in the wastewater treatment MBR systems. The comparison is done against a commercially available MBR module. Table 5 shows the total membrane area for a commercially available MBR module.

TABLE 5

Specs of a Commercial Submersible Flatsheet MBR Module

| 5 | Comparison with Commercial flatsheet MBR system | Measurement/ Unit |
|---|---|---|
| H | H: Overall module height H | 210 cm |
| L | L: Overall module Length L | 95 cm |
| W | W: Overall Width including inlet/outlet ports | 81 cm |
|   | Number of membrane elements per assembly | 50 Elements |
| $A_5$ | $A_5$ = Total membrane area per module is | 70 m² |

Table 6, below, shows the effective membrane area for the disclosed corrugated model having the same dimensions as the commercially available module summarized in Table 5, above. By utilizing the disclosed corrugated membrane plate and frame design, the effective membrane for the same size module was increased by 219%. The increase in effective membrane area would lead to a corresponding increase in production capacity for the disclosed corrugated membrane plate and frame module. The production capacity of the disclosed corrugated membrane plate and frame design is compared herein to an equivalently sized commercially available flatsheet MBR module in order to compare production efficiency on a uniform scale; however, the corrugated membrane plate and frame design can be sized up or down depending on the specific treatment application and is not limited to a single unit size.

TABLE 6

Corrugated Design for Wastewater Treatment Module Compared with Commercial MBR Module.

| 6 | Corrugated Design | Measurement/ Unit |
|---|---|---|
|   | Equation 1 --> $A_1 = H_e \times [2nC + \pi(n-1)(s+t)]$ | |
| $H_e$ | Effective height in each element = $H - H_g$ | 190 cm |
| D | Depth of each element D | 8.5 cm |
| E | E = Number of elements per module = L/D | 11 elements |
| C | Straight line depth = $D - s - 2t$ | 6.6 cm |
| n | Total number of turns per module $n = (W_e + s)/(s + t)$ | 62 turns |
| t | Thickness of each element in the module | 0.6 cm |
| s | Spacing between elements in the module | 0.7 cm |
| $A_6$ | $A_6 = E \times H_e \times [2nC + \pi(n-1)(s+t)]$ | 223.11 m² |
|   | $A_6/A_5$, whereas $A_5$ is commercial MBR membrane area per module (70 m²) | 3.19 |
| % A | $= 100 \times [(A_6/A_5) - 1]$ | 219% |

A further increase in the active membrane area can be achieved by adjusting the values of "t" and "s". For example, referring to the module in Table 6, reducing "s" and "t" to 0.2 cm increases the active membrane area to be 933% greater than a conventional module.

Although the examples above are based on a comparison of the submersible corrugated design with other submersible designs, the non-submersible corrugated design exhibits similar advantages over other non-submersible designs due to the increased active area of the corrugated membrane. Specifically, the non-submersible designs provide more than a 200% increase in the active membrane area compared to conventional non-submersible designs.

It should be recognized that the dimensions described in connection with the examples above are merely exemplary and that the disclosed modules can be implemented using a variety of different dimensions. As will be appreciated, modules of different dimensions will have different amounts of increased active membrane areas depending upon the particular dimensions.

While the invention disclosed herein is susceptible to various modifications and alternative forms, specific embodiments thereof have been shown by way of example in the drawings and are herein described in detail, which are all understood to exist and be within the scope of the invention as described and claimed. Furthermore, such details are understood to be variable or modifiable while still complying with the scope of the invention set forth herein and covered by the claims. It should be understood, however, that the description herein of specific embodiments is not intended to limit the invention to the particular forms disclosed, but on the contrary, the intention is meant to cover all modifications, equivalents, and alternatives falling within the spirit and scope of the invention as defined by the appended claims.

What is claimed is:

1. A water treatment device comprising:
   (a) a corrugated membrane plate and frame core having parallel rows of folds, and comprising:
      a corrugated frame with a corrugated bottom frame member, a corrugated top frame member, a vertical left side frame member, and a vertical right side frame member, said frame having a front side, a back side, a bottom side, a top side, and said bottom, top, left, and right frame members defining an open central area;
      a first corrugated membrane sheet with a top edge, a bottom edge, a left side edge and a right side edge attached to the front side of the corrugated frame along the top, bottom, left, and right frame members;
      a second membrane sheet with a top edge, a bottom edge, a left side edge and a right side edge attached to the back side of the corrugated frame along the top, bottom, left, and right frame members;
      said first and second membrane sheets forming a membrane lumen space in the open central area of the corrugated frame for collecting a permeated fluid, said corrugated membrane plate and frame core being sealed to prevent a fluid to be treated from entering the membrane lumen space without passing through one of the first and second corrugated membrane sheets, and an area of said first and second membrane sheets being formed that is coextensive with the membrane lumen space and provides an active membrane area where the top, bottom, left, and right edges of the first and second membrane sheets attached to the frame are inactive membrane areas;

(b) a fluid outlet manifold attached to a top side of the top frame member of the corrugated membrane plate and frame core, said fluid outlet manifold having an interior space that receives permeated fluid from the membrane lumen space via one or more openings in the top frame member, and a fluid outlet port for removing the permeated fluid from the interior space of the fluid outlet manifold and (c) a base attached to a bottom side of the bottom frame member of the corrugated membrane plate and frame core.

2. The water treatment device of claim 1, wherein the base comprises a gas inlet manifold having an interior space for receiving a gas, a gas inlet port, and a plurality of gas outlets on a top surface of the gas inlet manifold positioned to discharge the gas adjacent to an exterior of the corrugated membrane plate and frame core, said gas inlet manifold and said gas outlets being isolated from the membrane lumen space.

3. The water treatment device of claim 2, wherein the base further comprises a fluid inlet manifold attached to the bottom frame member, wherein a portion of the bottom frame member extends through the gas inlet manifold to contact the fluid inlet manifold while maintaining isolation from the gas in the gas inlet manifold interior space, said fluid inlet manifold having an interior space for receiving a fluid, a fluid inlet port, and one or more openings on a top surface adjacent to a plurality of openings in the bottom frame member through which fluid from the fluid inlet manifold can flow into the membrane lumen space of the corrugated membrane plate and frame core.

4. The water treatment device of claim 2, wherein the gas is air, nitrogen, saturated carbon-dioxide, or unsaturated carbon-dioxide.

5. The water treatment device of claim 3, wherein the fluid in the fluid inlet manifold is a draw fluid or a coolant fluid.

6. The water treatment device of claim 1, wherein a spacer selected from a perforated membrane plate and a non-woven mesh spacer sheet is positioned in the membrane lumen space between the first and second membrane sheets, wherein said spacer is attached to the frame members.

7. The water treatment device of claim 1, wherein the first and second membrane sheets are selected from forward osmosis membranes, reverse osmosis membranes, membrane distillation membranes, nanofiltration membranes, microfiltration membranes, or ultrafiltration membranes.

8. The water treatment device of claim 1, wherein the submersing fluid to be treated is saline water, brackish water, domestic wastewater, industrial wastewater, produced water, pharmaceutical fluids, and food and beverage fluids.

9. The water treatment device of claim 1, further comprising:

a housing having an inlet port for receiving the fluid to be treated, an outlet port for outputting some of the fluid to be treated, and a gas output port, wherein the housing is attached to the fluid outlet manifold and the base in an air-tight manner.

10. A method for treating water comprising the steps of:

a) providing a water treatment device having a corrugated membrane plate and frame core that comprises:

(i) a corrugated frame with a corrugated bottom frame member, a corrugated top frame member, a vertical left side frame member, and a vertical right side frame member, said frame having a front side, a back side, a bottom side, a top side, and said bottom, top, left, and right frame members defining an open central area;

(ii) a first corrugated membrane sheet with a top edge, a bottom edge, a left side edge and a right side edge attached to the front side of the corrugated frame along the top, bottom, left, and right frame members;

(iii) a second membrane sheet with a top edge, a bottom edge, a left side edge and a right side edge attached to the back side of the corrugated frame along the top, bottom, left, and right frame members;

said first and second membrane sheets forming a membrane lumen space in the open central area of the corrugated frame for collecting a permeated fluid, said corrugated membrane plate and frame core being sealed to prevent a fluid to be treated from entering the membrane lumen space without passing through one of the first and second corrugated membrane sheets, and an area of said first and second membrane sheets being formed that is coextensive with the membrane lumen space and provides an active membrane area where the top, bottom, left, and right edges of the first and second membrane sheets attached to the frame are inactive membrane areas;

(iv) a fluid outlet manifold attached to a top side of the top frame member of the corrugated membrane plate and frame core, said fluid outlet manifold having an interior space that receives permeated fluid from the membrane lumen space via one or more openings in the top frame member, and a fluid outlet port for removing the permeated fluid from the interior space of the fluid outlet manifold and (v) a base attached to a bottom side of the bottom frame member of the corrugated membrane plate and frame core;

b) providing a conduit for removal of permeated fluid from the fluid outlet manifold via the fluid outlet port;

c) applying a suction or negative pressure to the fluid outlet port;

d) exposing the water treatment device to the fluid to be treated; and e) removing the permeated fluid from the fluid outlet manifold via the fluid outlet port by delivering a gas to the gas inlet manifold.

11. The method for treating water of claim 10, wherein said gas inlet manifold has an interior space for receiving the gas, a gas inlet port for delivering a gas to the gas inlet manifold, and a conduit to deliver the gas to the gas inlet port, wherein the plurality of gas outlets on the top surface of the gas inlet manifold are positioned to discharge the gas adjacent to the exterior of the corrugated membrane plate and frame core in isolation from the membrane lumen space.

12. The method for treating water of claim 11, further comprising the steps of:

providing a fluid inlet manifold attached to the bottom frame member, said fluid inlet manifold having an interior space for receiving a fluid, a fluid inlet port, and an opening on a top surface adjacent to a plurality of openings in the bottom frame member which allow the fluid to flow into the membrane lumen space of the corrugated membrane plate and frame core, and said gas inlet manifold is positioned between the fluid inlet manifold and the bottom frame member, said gas being maintained in isolation from the fluid manifold and the membrane lumen space of the corrugated membrane plate and frame core;

providing a conduit to deliver a fluid to the fluid inlet manifold via the fluid inlet port; and delivering a draw fluid or a coolant fluid to the fluid inlet manifold, said draw fluid or coolant fluid enhancing movement of permeated fluid into the membrane lumen space.

13. The method for treating water of claim 11, wherein a spacer selected from a perforated membrane plate and a non-woven mesh spacer sheet is positioned in the membrane lumen space between the first and second membrane sheets, and said spacer is or is not attached to the frame members.

14. The method for treating water of claim 10, wherein the membrane sheets are selected from forward osmosis membranes, reverse osmosis membranes, membrane distillation membranes, nanofiltration membranes, microfiltration membranes, or ultrafiltration membranes.

15. The method for treating water of claim 10, wherein the fluid to be treated is saline water; brackish water, domestic wastewater, industrial wastewater, produced water, pharmaceutical fluids, and food and beverage fluids.

16. A water treatment device comprising:
  (a) a corrugated membrane plate and frame core comprising:
    a corrugated frame with a corrugated bottom frame member, a corrugated top frame member, a vertical left side frame member, and a vertical right side frame member;
    a first corrugated membrane sheet attached to a front side of the top, bottom, left side, and right side frame members;
    a second membrane sheet attached to a back side of the top, bottom, left, and right frame members, wherein the first and second membrane sheets form a membrane lumen space that is sealed to prevent fluid to be treated from entering the membrane lumen space without passing through one of the first and second corrugated membrane sheets;
  (b) a fluid outlet manifold attached to a top side of the top frame member, said fluid outlet manifold having an interior space that receives permeated fluid from the membrane lumen space via one or more openings in the top frame member of the frame and a fluid outlet port for removing the permeated fluid from the interior space of the fluid outlet manifold;
  (c) a fluid inlet manifold attached to the bottom frame member, said fluid inlet manifold having an interior space for receiving a fluid, a fluid inlet port, and one or more openings on a top surface adjacent to a plurality of openings in the bottom frame member that allows the fluid to flow into the membrane lumen space of the corrugated membrane plate and frame core; and
  (d) a gas inlet manifold positioned between the fluid inlet manifold and the bottom frame member having an interior space for receiving a gas, a gas inlet port, and a plurality of gas outlets on a top surface of the gas inlet manifold positioned to discharge the gas adjacent to an exterior of the first and second membranes, said gas inlet manifold and said plurality of gas outlets being isolated from the membrane lumen space.

17. The water treatment device of claim 16, wherein a spacer is selected from a perforated membrane plate and a non-woven mesh spacer sheet and is positioned in the membrane lumen space between the first and second membrane sheets, and said spacer is or is not attached to the frame members.

18. The water treatment device of claim 16, wherein the membrane sheets are selected from forward osmosis membranes, reverse osmosis membranes, membrane distillation membranes, nanofiltration membranes, microfiltration membranes, or ultrafiltration membranes.

19. The water treatment device of claim 16, wherein the active area of the corrugated membrane sheets in the corrugated membrane plate and frame core is over 200% greater than an active membrane area of a flatsheet plate and frame module having an equivalent height, width and depth.

20. The water treatment device of claim 16, further comprising:
  a housing having an inlet port for receiving the fluid to be treated, an outlet port for outputting some of the fluid to be treated, and a gas output port, wherein the housing is attached to the fluid outlet manifold and the base in an air-tight manner.

* * * * *